(12) United States Patent
Tilton

(10) Patent No.: US 10,421,848 B2
(45) Date of Patent: Sep. 24, 2019

(54) REPULPABLE AND RECYCLABLE COMPOSITE PACKAGING ARTICLES AND RELATED METHODS

(71) Applicant: Smart Planet Technologies, Inc., Newport Beach, CA (US)

(72) Inventor: Christopher R. Tilton, Laguna Hills, CA (US)

(73) Assignee: Smart Planet Technologies, Inc., Newport Beach, CA (US)

( * ) Notice: Subject to any disclaimer, the term of this patent is extended or adjusted under 35 U.S.C. 154(b) by 32 days.

(21) Appl. No.: 15/487,928

(22) Filed: Apr. 14, 2017

(65) Prior Publication Data

US 2017/0218161 A1   Aug. 3, 2017

Related U.S. Application Data

(63) Continuation of application No. 14/211,180, filed on Mar. 14, 2014, now Pat. No. 9,637,866.
(Continued)

(51) Int. Cl.
    *C08J 11/06* (2006.01)
    *B27N 3/28* (2006.01)
    (Continued)

(52) U.S. Cl.
    CPC ............. *C08J 11/06* (2013.01); *B27N 3/04* (2013.01); *B27N 3/28* (2013.01); *B32B 19/02* (2013.01);
    (Continued)

(58) Field of Classification Search
    CPC .................................. C08J 11/06; B27N 3/04
    See application file for complete search history.

(56) References Cited

U.S. PATENT DOCUMENTS

| 3,441,473 | A | 4/1969 | Brundige et al. |
| 3,894,904 | A | 7/1975 | Cook |

(Continued)

FOREIGN PATENT DOCUMENTS

| EP | 0326410 | 8/1989 |
| EP | 0811508 | 10/1997 |

(Continued)

OTHER PUBLICATIONS

Hanna Jokinen. Screening and Cleaning of Pulp—A Study to the Parameters Affecting Separation. Department of Process and Environmental Engineering. University of Oulu. (Year: 2007).*

(Continued)

*Primary Examiner* — Dah-Wei D. Yuan
*Assistant Examiner* — Kristen Dagenais-Englehart
(74) *Attorney, Agent, or Firm* — Umberg Zipser LLP

(57) ABSTRACT

Unexpectedly unique and environmentally friendly composite material structures, storage articles fabricated therefrom, and related methods. The composite structure includes at least one or more fiber-containing layers, such as fiberboard or other layers having fibers from natural and/or synthetic sources, and one or more mineral-containing layers. The mineral-containing layer(s) comprises a thermoplastic bonding agent fixing the mineral particles in place. The fiber-containing layer(s) and mineral-containing layer(s) can be shaped, sized, and manufactured such that the composite structure formed therefrom is capable of being machined to form the storage article. The composite structure can be repulped and recycled without the use of dispersions, emulsions, or aqueous solutions. Further, the composite reduces layer mass requirements for heat seal, barrier, and fiber adhesion compared to polymer layers. The composite structure further has tensile strength and other structural charac- (Continued)

teristics that allow it to be readily machined into desired storage article forms.

14 Claims, 11 Drawing Sheets

Related U.S. Application Data

(60) Provisional application No. 61/879,888, filed on Sep. 19, 2013, provisional application No. 61/782,291, filed on Mar. 14, 2013.

(51) Int. Cl.
| | |
|---|---|
| *D21H 15/00* | (2006.01) |
| *D21J 1/08* | (2006.01) |
| *D21F 11/12* | (2006.01) |
| *C08J 5/04* | (2006.01) |
| *B27N 3/04* | (2006.01) |
| *C08K 3/26* | (2006.01) |
| *B32B 27/12* | (2006.01) |
| *B32B 19/02* | (2006.01) |
| *B32B 27/20* | (2006.01) |
| *B05D 1/26* | (2006.01) |

(52) U.S. Cl.
CPC .............. *B32B 27/12* (2013.01); *B32B 27/20* (2013.01); *C08J 5/045* (2013.01); *C08K 3/26* (2013.01); *D21F 11/12* (2013.01); *D21H 5/12* (2013.01); *D21J 1/08* (2013.01); *B05D 1/265* (2013.01); *B05D 2252/00* (2013.01); *B32B 2260/025* (2013.01); *B32B 2260/046* (2013.01); *B32B 2264/10* (2013.01); *B32B 2307/702* (2013.01); *B32B 2307/72* (2013.01); *B32B 2307/7246* (2013.01); *B32B 2439/00* (2013.01); *C08J 2323/06* (2013.01); *C08K 2003/265* (2013.01); *Y10T 428/24967* (2015.01); *Y10T 428/258* (2015.01); *Y10T 428/259* (2015.01); *Y10T 428/264* (2015.01)

(56) References Cited

U.S. PATENT DOCUMENTS

| | | | |
|---|---|---|---|
| 3,911,191 A | 10/1975 | Guastella et al. | |
| 4,028,452 A | 6/1977 | Driscoll | |
| 4,120,916 A | 10/1978 | Meyer et al. | |
| 4,210,487 A | 7/1980 | Driscoll | |
| 4,254,173 A | 3/1981 | Peer, Jr. | |
| 4,368,841 A | 1/1983 | Eddy | |
| 4,472,229 A | 9/1984 | Martin | |
| 4,507,358 A | 3/1985 | Takaoka et al. | |
| 4,692,212 A | 9/1987 | Swenson et al. | |
| 4,851,458 A | 7/1989 | Hopperdietzel | |
| 4,853,276 A | 8/1989 | Kurushima | |
| 4,894,192 A | 1/1990 | Warych | |
| 4,946,372 A | 8/1990 | Avni | |
| 5,053,268 A | 10/1991 | Ehara et al. | |
| 5,084,360 A | 1/1992 | Young | |
| 5,434,004 A | 7/1995 | Ai ioka et al. | |
| 5,494,735 A | 2/1996 | Nitta | |
| 5,515,975 A | 5/1996 | Jarvis et al. | |
| 5,803,260 A | 9/1998 | Tilton | |
| 5,827,607 A | 10/1998 | Deaner et al. | |
| 5,837,383 A | 11/1998 | Wenzel et al. | |
| 5,863,414 A | 1/1999 | Tilton | |
| 5,962,123 A | 10/1999 | Mehta et al. | |
| 6,010,595 A | 1/2000 | Mitchell et al. | |
| 6,016,913 A | 1/2000 | Tilton | |
| 6,150,005 A | 11/2000 | Williams et al. | |
| 6,183,814 B1 | 2/2001 | Nangeroni et al. | |
| 6,224,973 B1 | 5/2001 | Trouilhet | |
| 6,231,970 B1 | 5/2001 | Andersen et al. | |
| 6,258,308 B1 | 7/2001 | Brady et al. | |
| 6,274,248 B1 | 8/2001 | Goto et al. | |
| 6,387,504 B1 | 5/2002 | Mushovic | |
| 6,416,620 B1* | 7/2002 | Narancic | C08L 91/00 162/5 |
| 6,730,249 B2 | 5/2004 | Sears et al. | |
| 6,787,205 B1 | 9/2004 | Aho et al. | |
| 7,452,573 B2 | 11/2008 | Fish et al. | |
| 7,740,740 B2 | 6/2010 | Mohan et al. | |
| 7,749,583 B2 | 7/2010 | Fugitt et al. | |
| 7,954,306 B2 | 6/2011 | Gould | |
| 8,889,228 B2 | 11/2014 | Zuercher et al. | |
| 2002/0127358 A1 | 9/2002 | Berlin et al. | |
| 2003/0203231 A1 | 10/2003 | Stopper et al. | |
| 2003/0211348 A1 | 11/2003 | Mueller et al. | |
| 2003/0232211 A1 | 12/2003 | Kendall et al. | |
| 2004/0023052 A1 | 2/2004 | Ambroise | |
| 2004/0052987 A1 | 3/2004 | Shetty et al. | |
| 2004/0127614 A1 | 7/2004 | Jiang | |
| 2004/0249046 A1 | 12/2004 | Abhari et al. | |
| 2005/0115690 A1* | 6/2005 | Bohlig | D21C 5/02 162/4 |
| 2005/0238824 A1 | 10/2005 | Ogonowski et al. | |
| 2006/0151350 A1 | 7/2006 | Tilton | |
| 2006/0167169 A1 | 7/2006 | Arana | |
| 2006/0198987 A1 | 9/2006 | Grob et al. | |
| 2006/0286325 A1 | 12/2006 | Swoboda et al. | |
| 2007/0025904 A1 | 2/2007 | Skuse et al. | |
| 2007/0051652 A1 | 3/2007 | Tilton | |
| 2009/0045210 A1 | 2/2009 | Tilton | |
| 2009/0047499 A1 | 2/2009 | Tilton | |
| 2009/0047511 A1* | 2/2009 | Tilton | B32B 5/24 428/337 |
| 2009/0047525 A1 | 2/2009 | Tilton | |
| 2009/0098375 A1 | 4/2009 | Voison et al. | |
| 2009/0142528 A1 | 6/2009 | Tilton | |
| 2010/0003431 A1 | 1/2010 | Raybuck | |
| 2010/0065235 A1 | 3/2010 | Fike et al. | |
| 2010/0137493 A1 | 6/2010 | Tilton | |
| 2011/0151185 A1 | 6/2011 | Cree | |
| 2013/0323504 A1 | 12/2013 | Zhou | |

FOREIGN PATENT DOCUMENTS

| | | |
|---|---|---|
| FR | 2367594 | 5/1976 |
| GB | 1534128 | 11/1976 |
| JP | 62144931 | 6/1987 |
| JP | 02033399 | 2/1990 |
| JP | 08197829 | 8/1996 |
| JP | 10059468 | 3/1998 |
| JP | H11-227111 | 8/1999 |
| JP | 2000015765 | 1/2000 |
| JP | 2001-081695 A | 3/2001 |
| JP | 201214396 | 8/2001 |
| JP | 2004507385 | 3/2002 |
| JP | 2003-502180 | 1/2003 |
| JP | 2004-230620 | 8/2004 |
| JP | 2005-053541 | 3/2005 |
| JP | 2006-045578 | 2/2006 |
| JP | 2006-150616 | 6/2006 |
| JP | 2006-257583 | 9/2006 |
| JP | 2007-01517 | 1/2007 |
| WO | WO 02102593 | 12/2002 |
| WO | WO 03029001 | 4/2003 |
| WO | WO 2004/074130 | 9/2004 |
| WO | 2004106630 A2 | 12/2004 |
| WO | WO 2005095515 | 10/2005 |
| WO | WO 2007078454 | 7/2007 |
| WO | 2009005947 A1 | 1/2009 |
| WO | 2009026256 A1 | 2/2009 |
| WO | 2010091427 A2 | 8/2010 |
| WO | WO 0187596 | 11/2011 |
| WO | WO 2012/032514 | 3/2012 |

OTHER PUBLICATIONS

International Search Report on related PCT Application No. PCT/US2014/028962 from International Searching Authority (KIPO) dated Jul. 29, 2014.

(56) References Cited

OTHER PUBLICATIONS

International Search Report on related PCT Application No. PCT/US2014/028947 from International Searching Authority (KIPO) dated Aug. 1, 2014.
Scrap Specifications Circular, Oct. 22, 2009, 1-57, Institute of Scrap Recycling Industries, Inc.,US.
International Search Report on related PCT Application No. PCT/US2010/023671 from International Searching Authority (KPO) dated Sep. 30, 2010.
Office Action, "Notification of Reasons for Rejection" on related Japanese Patent Application No. 2011-549341 dated Nov. 12, 2013.
Patent Examiner's Wikipedia.com entry for "starch," on related U.S. Appl. No. 12/368,130, accessed May 17, 2014.
Affinity Polyolefin Plastometers and Polyolefin Elastomers: Product Selection Guide, The Dow Chemical Company, Jul. 2013; 4 pgs.
Dow LDPE PG 7008 (Extrusion Coating): Low Density Polyethylene Resin, Technical Information, The Dow Chemical Company, Apr. 2013; 2 pgs.
Dow Elite 5800G: Enhanced Polyethylene Resin, Technical Information, The Dow Chemical Company, Jun. 2008; 2 pgs.
Guy, et al., "Calcium Carbonate for Polyolefine Extrusion Coating Applications," TAPPI Conference, Aug. 29-Sep. 2, 2004; 4 pgs.
TAPPI PLACE Division Conference: Aug. 29-Sep. 2, 2004, Conference Proceedings; 7 pgs.
Jokinen, Hanna, "Screening and Cleaning of Pulp—A Study to the Parameters Affecting Separation," Department of Process and Environmental Engineering, University of Oulu, 2017; 106 pgs.
Notice of Opposition to a European Patent for EP2393659 dated Mar. 13, 2019; 6 pgs.
Notice of Opposition: Facts and Arguments for EP2393659 dated Mar. 13, 2019; 19 pgs.

\* cited by examiner

REPULPABLE AND RECYCLABLE COMPOSITE PACKAGING ARTICLES AND RELATED METHODS

RELATED METHODS

This application is a continuation of U.S. patent application Ser. No. 14/211,180, filed Mar. 14, 2014, and claims priority to provisional application Ser. No. 61/879,888, filed on Sep. 19, 2013, and to provisional application Ser. No. 61/782,291, filed on Mar. 14, 2013. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The present embodiments relate generally to repulpable and recyclable composite packaging materials and/or finished packaging structures.

BACKGROUND

Packages and packaging materials for retail and shipping purposes are typically designed to be sufficiently durable to allow reliable use of the materials and protection of packaged goods. For environmental and economic reasons, pulping and recycling characteristics are critical considerations in the development of such packages and materials. Other important considerations include barrier performance, heat seal during fabrication, surface energy, and efficiency in manufacturing.

SUMMARY OF THE INVENTION

Compositions and methods that provide for a composite material that is readily recyclable are provided. The composite material is configured to generate polymer-containing particles that are readily separable from fibrous content when subjected to recycling operations.

One embodiment of the inventive concept is a method of recycling a composite material (e.g. such as a composite material having a caliper of about 0.254 mm to about 0.762 mm), where the method includes obtaining a composite material having a fiber layer and a barrier layer that is coupled to the fiber layer. This barrier layer includes a mineral containing layer having a mineral content of 15% to 70%. The composite material is pulped to produce released fibers and mineral containing layer fragments. These mineral containing layer fragments have an area of about 0.01 $mm^2$ to about 5 $mm^2$ and a density ranging from about 1.01 $g/cm^3$ to about 4.25 $g/cm^3$. Unwanted materials, which include at least a portion of the mineral containing layer fragments, are separated from the released fibers by a screening process having a rejection rate of less than 25% by weight of the composite material and a screen cleanliness efficiency is greater than 60%. In some embodiments the screening process includes applying a suspension that includes the released fibers to one or more screening plates (e.g. a hole screen, a slotted screen, and a contoured screen). Suitable hole screens can have one or more hole screen openings having a diameter of about 0.8 mm to about 1.5 mm. Suitable slotted screens can have one or more slotted screen openings having a width of about 0.1 mm to about 0.4 mm. Suitable contoured screens can have one or more contoured screen openings having a width of about 0.1 mm to about 0.4 mm. The pressure drop across such screening plates can be less than about 12 kPa of Feed-Accept pressure.

In some embodiments the method includes a post-screening process step, which can include centrifugal cleaning of screen accepts (for example, using a tapered cylinder). Such screen accepts can include at least a portion of the unwanted materials and at least a portion of the released fibers. This produces cleaned fibers (e.g. the released fibers separated from the unwanted materials) that are carried inward to an accepted stock inlet. The unwanted materials include at least a portion of the mineral containing layer fragments, and more than 70% by mass of the mineral containing layer fragments of the unwanted materials are removed from the screen accepts in this process. Such mineral containing layer fragments are at least partially spherical and have a diameter of about 0.05 µm to about 150 µm. Overall recovery of the fiber layer of the composite is greater than about 70%.

BRIEF DESCRIPTION OF THE DRAWINGS

The present embodiments now will be discussed in detail with an emphasis on highlighting the advantageous features. These embodiments depict the novel and non-obvious repulpable and recyclable composite packaging articles and related methods shown in the accompanying drawings, which are for illustrative purposes only. These drawings include the following figures, in which like numerals indicate like parts.

DETAILED DESCRIPTION

Figure 1:
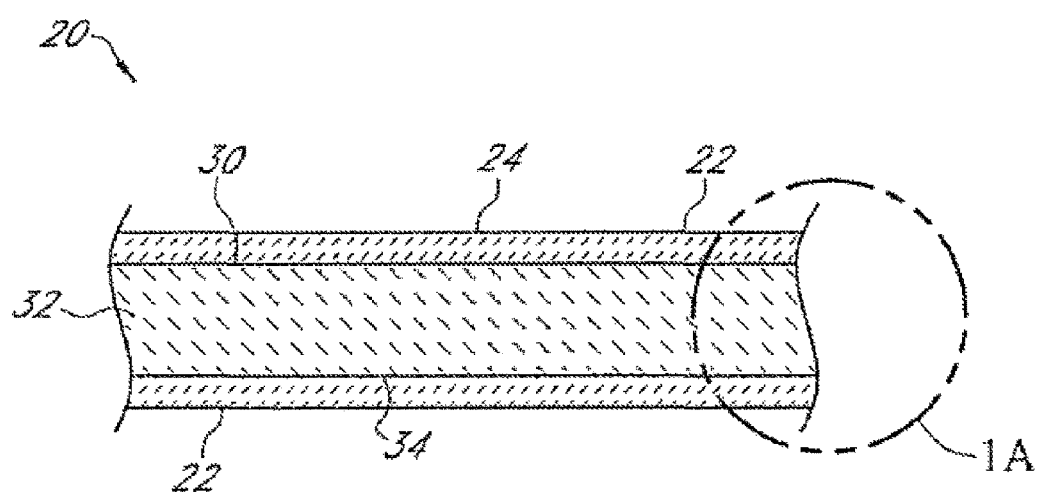
FIG. 1 is a schematic side cross-sectional view of a multilayer repulpable packaging composite material according to the present embodiments.

The present embodiments relate to methods and compositions providing repulpable and recyclable consumer packaging for containing, for example and without limitation, food products, dry goods, detergents, etc. More particularly, the present embodiments include using mineral-containing layer(s), minerals bonded by thermoplastic polymers and subsequently adhered to fiber-containing layer(s) using extrusion coating, extrusion lamination, or lamination adhering the mineral-containing layer continuously and substantially to the surface or surfaces of natural fiber-containing layers such that the finished package can be effectively repulped and recycled using both pre-consumer and post-consumer collection methods. The present embodiments provide reusable pulp, thus offering reusability and reprocess ability into valuable recycled paper-containing packaging products. The present packaging composites can be used to form one or more layers of all types of single-layer and multilayer packaging structures, e.g. folding cartons and the like, including single-wall or multi-wall corrugated structures using the composite packaging material as one or more inner or outer liner(s) and/or corrugated medium(s).

It is current practice, for example, to add a film of polyethylene (PE), polypropylene (PP), polyester, wax, or polyvinylidene chloride (PVDC) on paper substrates to provide a moisture barrier. Also, various types of emulsion and aqueous coatings are applied to paper substrates for the same reason. However, it is believed that there are no repulpable and recyclable solutions that offer the efficiencies of high speed thermoplastic extrusion coating of mineral-containing pellets forming a layer. The present embodiments provide finished composite materials having high barrier performance, heat sealability, high performance adhesion to fiber, strength, repulpability, and low cost of manufacture. Further, other resins may be used to give packaging materials barrier performance, such as polyacrylates, polyvinyl acetates, and the like. However, these materials are more expensive than wax, polyethylene and PVDC. Predominantly, barrier alternatives are considered by recycling (repulping) mills to be non-repulpable, mainly because they introduce quality problems in the fiber recovery process, either by upsetting the process, e.g. by plugging filter screens, or by contaminating the finished product. Approximately 20% of known paperboards are laminated with the materials listed above, or similar materials, resulting in products that are incompatible within the recycling industry.

A major drawback to polyolefin and other polymer coatings, such as wax, acrylic, polyethylene terephthalate (PET) dispersions, and PVDC barrier layers, is that they are either difficult to reprocess or recycle and usually discarded, or they can only be processed at a recycling mill with specialized equipment, or, if processable, provide inferior barrier and heat seal performance for packaging articles such as cups or heat sealed folding cartons. For environmental and cost reasons, the disposal of moisture barrier packaging materials has become an important issue for paper mills and their customers. Repulping these materials poses special problems for the industry. The moisture barrier layer manifests problems in recovering the useful fiber from the package. Presently, nearly all of these packages are ultimately discarded into landfills or incinerated, which raises issues with respect to the environment and public health, particularly for PVDC. Reprocessing packaging to recover wood fibers is an important source of wood fibers, and helps avoid waste of high quality and costly fibers.

When forming packaging that contains food products and dry goods, heat scalability is often important for closures. Also, the packaging structure preferably provides a barrier for moisture, oxygen, oils, and fatty acids. Other desirable characteristics include mechanical performance, aesthetics, cosmetics, resistance to chemicals, recyclability, heat sealability, surface energy, ink adhesion, ink wet-ability, film adhesion to fibers, improved surface for glue and adhesive application, and barrier performance (against oxygen, water, moisture, etc.). Therefore, extrusion coating fiber surfaces using polymers, (polyolefins being the most common) and bio-polymers is common practice.

Two methods are commonly used for reprocessing wood fibers. The first method breaks up the source of wood fibers, such as packaging materials, by repulping, while other materials are filtered out. The second method breaks up the packaging materials such that any non-fibrous material breaks up into tiny pieces (generally smaller than 1.6 mm), which then pass through the filter screen(s) with the wood fibers to constitute a pulp. This second method is frequently carried out with chemical additives and/or additional equipment, making it expensive and therefore undesirable.

However, no known resins, with our without wax, used in high-performance barrier layers, can be reprocessed without additional manufacturing steps. Recycling these materials is therefore difficult if not impossible. Additionally, the presence of wax in resins frequently results in a lower quantity of usable pulp, and therefore increases the amount of waste. In the repulping process, waste materials may break up into very tiny particles, often smaller than 0.7 mm. These particles pass through the filter screen(s) and contaminate pulp that is sent to the paper machine. Problems repulping wax include clogging the felts, gumming up the can dryer causing web breaks, sticky related unacceptable paper surface cosmetics, and yield reduction.

The repulping of PE and PP barrier layers (as with most polymers) is very difficult. During reprocessing, while polyolefin is in the pulper, it separates from the fiber and the polyolefin breaks into large pieces with estimated widths from about 0.3 cm to 3.0 cm, or larger pieces and particles having densities in a range from about 0.875 $g/cm^3$ to about 0.995 g/cm3 and higher. These pieces cause screen plugging, requiring expensive downtime to clean, and generate solid waste. However, mineralized layers when repulped break down into a preponderance of from about 35% to about 99% of much smaller and more dense fragments in sizes of from about 0.0005 $mm^2$ to about 2 $mm^2$ or larger, having densities from about 1.10 $g/cm^3$ to about 4.75 $g/cm^3$. These unique particles provide improved repulping and recycling processing benefits. Therefore, the mineral-containing layers can be applied successfully to fiber-containing layers with improved re-pulpability vs. polymer layers with mineral-containing layers applied in coat weights in the range of from about 4 lbs/msf (pounds per thousand square feet) to about 25 lbs/msf. The processing of the mineralized layer composite material can be accomplished using industry standard repulping and recycling equipment, much of which is further described in this specification.

Also, for normal processing it is important for the recycler to use a standard pulper equipped with a steam line, using typical screens of various sizes and an operating centrifuge. PVDC coating also has generally the same processing issues as PE. Further, other options such as emulsion and aqueous coating with vinyl content cannot provide comparable barrier performance or high performance heat scalability at low cost. Also, mixing at the point of manufacture is often required and single or multiple layers of vinyl plus separate layers for minerals, for example, may be required. Also, unlike polyolefins, barrier failure is quite common using these types of layers at points of package stress or fracture during converting or subsequent use. Finally, PVDC and related coatings provide major environmental toxic hazards and are therefore a poor option as a barrier layer.

During repulping, non-fibrous barrier layers must be structurally brittle enough to break into small enough pieces to ensure the fibers efficiently release from the barrier layer and pass through the screen(s). Also, the pulped barrier layer fragments must not be too small to pass through the screen(s) and create process difficulties in the paper making machine. Finally, the pulped barrier layer pieces cannot be so large as to clog the screen(s) and foul the filtering process.

By introducing mineral content into a thermoplastic barrier layer using proper particle specifications and proper amounts of minerals added, the mineral-containing polyolefin layer obtains structural attributes providing for efficient, clean, and proper processing during the pulping process. Also, a 20%-70% mineralized layer easily releases fiber content through the screen(s), resulting in high fiber yields. Further, by using an extrusion coated thermoplastic, high speed, efficient production applying the barrier layer to the fiber can be enjoyed using common processes such as extrusion coating. Without the need for water based or other dispersions, press line applications, emulsions, or use of single or multiple layers containing vinyl, adjunct or additional layers of similar materials or minerals, the thermoplastic content acts as a bonding agent for the particles, bonding the mineral particles together, fixing them in position in a compounded thermoplastic and mineral-containing resin pellet, heated at temperatures above 400° F., and extrusion coated in-line on a single piece of equipment an extrusion laminated on a single piece of equipment at high speeds from about 100 FPM (feet per minute) up to about 3,500 FPM on paper rolls up to and over from about 30" to about 140" wide. The mineral-containing layer resin is extruded as a pre-mixed or master batch pellet, and as such the layer maintains its original integrity after extrusion. Therefore, unlike aqueous or emulsion coatings, no mixing is required prior to coating, and drying is not required during production at the point of printing and converting. The mineralized polyolefin or polymer layer provides additional benefits, such as high speed heat sealing and improved barrier performance. Additional benefits may include an excellent surface for the application of room temperature and hot melt adhesives when forming a package and high levels of moisture, oil, and fatty acid barrier performance.

The fiber component of the repulpable composite may comprise softwood fibers, hardwood fibers, or a mixture thereof. For example, the paper substrate may comprise from about 5% to about 95% (such as from about 25% to about 90%) softwood fibers and from about 5% to about 95% (such as from about 25% to about 90%) hardwood fibers. Paper substrates may also have, for example, a basis weight of from about 30 to about 200 lbs/3000 sq. ft and a caliper (thickness) of from about 0.006" to about 0.048".

During paper repulping and processing, the fibers are subjected to a cleansing and filtering process provided by one or more screens, thus removing unwanted materials from the re-pulped fiber. Screen plates are commonly designed to be either hole, slotted, or contoured screens. The amount and type of rejected and removed material can have an impact on screen cleanliness. If the screens become clogged, they fail to function and must be cleaned, creating expensive downtime during processing. The plates are normally found one behind another with an A plate having the smallest perforations, an intermediary B plate, and often a C plate having the largest perforations. Because of the size and conformation of plastic coating fragments generated during repulping, the plastic rejects clog and dirty the screening system, creating downtime and general inability to process efficiently. However, mineral-containing layers create dense particles from about 5 mm$^2$ to about 0.01 mm$^2$. Therefore, based upon reject rates from about 10% to about 25% by weight of the starting paper, the screen cleanliness efficiency achieved can be from about 60% to about 100%, including pressure screen devices. Further, the pressure drop, expressed as Feed-Accept pressure, can range from about 2 kPa to about 12 kPa on smooth, contoured, or heavily contoured screens.

Post screen processing includes centrifugal cleaning of the screen accepts. This pulp cleaning process uses fluid pressure to create rotational fluid motion in a tapered cylinder, causing denser particles to move outside faster than lighter particles. During cleaning, good fiber yields are carried inward and upward to the accepted stock inlet. Impurities such as dirt, metals, inks, sand, and any impurities are held in the downward current and removed from the bottom of the cleaner. Mineral-containing layer impurities found in fiber accepts and rejects have a density of from about 1.01 g/cm$^3$ to about 4.25 g/cm$^3$. Because the particles have large density differences from water, and size characteristics, the particles are effectively removed and cleaned from the accepts during cleaning. The mineral-containing impurities process out of the fiber accepts efficiently in High Density, Forward, and Through Flow cleaners, the cleaners having a diameter of from about 70 mm to about 400 mm. Further, these particles process out of fibers having reject rates on or about 0.1-1% to about 5-30%. Additionally, because some particles are typically somewhat spherical in shape (CwAp) they separate more efficiently during centrifugal cleaning. Finally, because the particles are smaller in size and generally dense, they can often achieve a removal efficiency of from about 50% to about 95% by mass, particle sizes of from about 150 microns to about 0.05 microns using singularly or in combination, specific gravity activated centrifugal cleaners, flotation washers, and ultra-dispersion washing, the repulpable and recyclable composite material having a pulper consistency of from about 3% to about 30%, pulping temperatures of from about 100° F. to about 200° F., and pulping times of from about 10 minutes to about 60 minutes, with pulping pH from about 6 to about 9.5 ±0.5. Process pressure screens can have holes from about 0.050" to about 0.075" with slots from about 0.006" to about 0.020".

Table 1, below, illustrates estimated repulpability ranges of a composite containing paper layer(s) combined with mineralized layer(s). The chart is also applicable when using paper layer(s) fiber fine content from about 0.5% to 60% by weight of the paper. This data is congruent using various pulping batch and continuous pulping methods including low consistency continuous, rotor de-trashing, drum pulping having 9-20 RPM, high consistency drum pulping, and drum pulping containing 4 mm to 8 mm holes, pulping consistency from about 3% to about 20%, also, using disk, pressure, and cylindrical screen types with hole type screen openings from about 0.8 mm to about 1.5 mm and slot and contoured type openings from about 0.1 mm to about 0.4 mm, further including coarse to fine screen holes and slots from about 0.150 mm to about 2.8 mm, and screen rotor circumference speeds from about 10 meters/second (m/s) to about 30 m/s.

TABLE 1

Composite Repulpability

| Caliper (in.) | lbs/3 msf | Mineral Content of Barrier Layer(s) | Thermoplastic Bonding Agent | Screen Yield (Accepts) | Inorganic Matter | Total Overall Recovery |
|---|---|---|---|---|---|---|
| 0.010 | 136 | 30%-65% | 30%-70% | 60%-90% | 1%-40% | 70%-95% |
| 0.012 | 157 | 30%-65% | 30%-70% | 60%-90% | 1%-40% | 70%-98% |
| 0.014 | 172 | 30%-65% | 30%-70% | 60%-90% | 1%-40% | 70%-98% |
| 0.016 | 190 | 30%-65% | 30%-70% | 60%-90% | 1%-40% | 70%-98% |
| 0.018 | 208 | 30%-65% | 30%-70% | 60%-90% | 1%-40% | 70%-98% |
| 0.020 | 220 | 30%-65% | 30%-70% | 60%-90% | 1%-40% | 70%-98% |
| 0.022 | 241 | 30%-65% | 30%-70% | 60%-90% | 1%-40% | 70%-98% |
| 0.024 | 259 | | 30%-70% | 60%-90% | 1%-40% | 70%-98% |
| 0.026 | 268 | | 30%-70% | 60%-90% | 1%-40% | 70%-98% |
| 0.028 | 276 | | 30%-70% | 60%-90% | 1%-40% | 70%-98% |
| 0.030 | 286 | | 30%-70% | 60%-90% | 1%-40% | 70%-98% |

Note:
Percentages are "by weight" of the total composition. MSF is "thousand square feet." % of inorganic matter is based upon industry standard ash tests. Repulpability data per Tappi and Fibre Box Association industry standard testing and Georgia Tech IPST reporting.

Various diatomaceous earth mineral fillers and pigments are available for use within the repulpable mineral-containing layer within the composite structure including mica, silica, clay, kaolin, calcium carbonate, dolomite, and titanium dioxide to name a few. The fillers offer improved performance for barrier, opacity, increased stiffness, thermal conductivity, and strength. Fillers are normally less expensive than polymers and are therefore a very economical component of the polymer layer. The most commonly used mineral fillers have densities in the range of 2.4 g/cm³ to 4.9 g/cm³. Most polymers have densities in the range of 0.8 g/cm³ to 1.85 g/cm³ and many can be used as thermoplastic bonding agents.

Filler particles can vary in size and shape. Size can vary from 0.1 micron to 10.0 micron mean particle size. An example of very fine mineral particles include nano-precipitated calcium carbonate which are less than 100 nanometers in size. Ultrafine nanoparticles can range from 0.06 microns to 0.15 microns. These ultrafine particles are useful for controlling rheological properties such as viscosity, sag, and slump. Mineral filler particles can have various shapes including e.g. spheres, rods, cubes, blocks, flakes, platelets, and irregular shapes of various proportions. The relationship between the particles' largest and smallest dimensions is known as aspect ratio. Together, aspect ratio and shape significantly impact the particles' effect in a composite polymer matrix. In yet other examples, particle hardness relates to coarseness, color to layer cosmetics and opacity. Particle morphology suited for the present embodiments are primarily, but not limited to, the cube and block shapes of salt and calcite having the characteristics shown in Table 2, below. Examples of cubic structures include calcite and feldspar. Examples of block structures include calcite, feldspar, silica, barite, and nephelite.

TABLE 2

Mineral Physical Properties

| PARTICLE CLASS | CUBE | BLOCK |
|---|---|---|
| Type | Cubic, Prismatic, Rhombohedral | Tabular, Prismatic, Pinacoid, Irregular |
| Aspect/Shape Ratios: | | |
| Length | ~1 | 1.4-4 |
| Width | ~1 | 1 |
| Thickness | ~1 | 1-<1 |
| Sedimentation | esd | esd |
| Surface Area Equivalence | 1.24 | 1.26-1.5 |

Mineral particles also often have higher specific gravity than polymers. Therefore, the density increases cost through elevated weight. Many particles are surface treated with fatty acids or other organic materials, such as stearic acid and other materials to improve polymer dispersion during compounding. Surface treatments also affect dry flow properties, reduce surface absorption, and alter processing characteristics. The specific gravity range potential of the minerals used in the present embodiments including pigments are from about 1.8 to about 4.85 g/cm³.

It is advantageous to disperse fillers and pigments (which provide opacity and whiteness to the polymer composite) effectively in order to obtain good performance. For fillers, impact strength, gloss, and other properties are improved by good dispersion. For pigments, streaking indicates uneven dispersion, whereas a loss in tinting strength may be observed if the pigment is not fully de-agglomerated. Agglomerates act as flaws that can initiate crack formation and thus lower impact strength. In the present embodiments, agglomerates are preferably less than about 30 microns to preferably less than about 10 microns in size.

Resin and composite extrudate sensitivity to heat becomes important during extrusion coating and extrusion lamination production. Small alterations during processing have an outsized impact upon pre- and post-extrusion results. Table 3 is a sample, but not limited to, extrusion coating production ranges for identified mineral-filled resins. In Table 3, the melt index measurements were stated under the guidelines of ASTM method D1238-04, and the density measured under the guidelines of ASTM standard method D1501-03.

TABLE 3

Operating Parameters, Mineralized Composite Resins, Monolayer, Coextrusion and Multilayer Mineral-Containing Composites, to Fiber-Containing Layers

| | Extruder #1 Monolayer | ROLL Extruder #2-#6 Coextrusion or separate downstream units | Maximum ranges Plus & Minus as a % of stated value or stated value | Comments below do not represent limitations |
|---|---|---|---|---|
| RESIN SUPPLIER GRADE NUMBER | Earth Coating Standridge Color TBD | Earth Coating Standridge Color TBD | | |

TABLE 3-continued

Operating Parameters, Mineralized Composite Resins, Monolayer, Coextrusion and Multilayer Mineral-Containing Composites, to Fiber-Containing Layers

| | ROLL | | | |
|---|---|---|---|---|
| | Extruder #1 Monolayer | Extruder #2-#6 Coextrusion or separate downstream units | Maximum ranges Plus & Minus as a % of stated value or stated value | Comments below do not represent limitations |
| MELT FLOW - Carrier Resin(s)/bonding agent | EST: 16 g/10 min | EST: 16 g/10 min | 4 g 10/min to 16 g/10 min | Interspersed and non-interspersed |
| COMPOUND DENSITY | 1.25 g/cm³ | 1.25 g/cm³ | 1.01-4.90 g/cm³ | Molecular weight from (Mz 150,00 to 300,000) |
| MINERAL CONTENT | 40% | 40% | General mineral content 15-60% by weight | Interspersed and non-interspersed |
| MELT TEMPERATURE | 590° F. (307° C.) | TBD | ±20% | |
| DESIRED BARREL PRESS. | 1600-2200 psi | TBD | 1200-2500 psi | From 1 to 6 extruders |
| Composite Melt Flow | 2-12 g/10 min | 2-12 g/10 min | 2 g/10 min-14 g/10 min | Interspersed and non-interspersed |
| Air Gap | 8" | 4"-12" | 4"-16" | |
| Die Gap | 0.025"-0.030" | 0.025"-0.040" | 0.020"-0.050" | From 1 to 6 Coextrusion |
| Monolayer and Coextrusion or separate downstream #2-#6 Co-layers TEMPERATURE SETTINGS | Initial Settings Barrel Zones | Maximum Adjustment Barrel Zones | Settings Die Zone | Maximum Adjustment Die Zone |
| Melt Temperature | 590° F. | Up to ±25% | | |
| BARREL ZONE #1 | 405° F. | Up to ±35% | Die Zone 1 | 585° F. ±25% |
| BARREL ZONE #2 | 540° F. | Up to ±35% | Die Zones 2-10 (as applicable to equipment) | 595° F. ±25% |
| BARREL ZONE #3 | 575° F. | Up to ±35% | Die Zone 11 (as applicable to equipment) | 585° F. ±25% |
| BARREL ZONE #4 | 590° F. | Up to ±35% | | |
| BARREL ZONE #5 | 590° F. | Up to ±35% | | |
| Other barrel Zones, if applicable on specific equipment | 590° F. | Up to ±35% | Other die zones if applicable | Up to ±35% |

Molecular chains in crystalline areas are arranged somewhat parallel to each other. In amorphous areas they are random. This mixture of crystalline and amorphous regions is essential to the extrusion of good extrusion coatings. The crystals can act as a filler in the matrix, and so can mineralization, improving some mechanical properties. A totally amorphous polyolefin would be grease-like and have poor physical properties. A totally crystalline polymer would be very hard and brittle. High-density polyethylene (HDPE) resins have molecular chains with comparatively few side chain branches. Therefore, the chains are packed closely together. Polyethylene, polypropylene, and polyesters are semi-crystalline. The result is crystallinity up to 95%. Low-density polyethylene (LDPE) resins have, generally, a crystallinity ranging from 60% to 75%, and linear low-density polyethylene (LLDPE) resins have crystallinity from 60% to 85%. Density ranges for extrusion coating resins include LDPE resins that range from 0.915 g/cm³ to 0.925 g/cm³, LLDPE resins have densities ranging from 0.910 g/cm³ to 0.940 g/cm³, and medium-density polyethylene (MDPE) resins have densities ranging from 0.926 g/cm3 to 0.940 g/cm³. HDPE resins range from 0.941 g/cm³ to 0.955 g/cm³. The density of PP resins range from 0.890 g/cm³ to 0.915 g/cm³.

Addition of a mineral filler to the polymer results in a rise in viscosity. The addition of filler may also change the amount of crystallinity in the polymer. As polymer crystals are impermeable to low molecular weight species, an increase in crystallinity also results in improved barrier properties, through increased tortuosity. This effect is expected to be prevalent for fillers that induce a high degree of transcrystallinity. Some minerals can change the crystallization behavior of some thermoplastics and thus the properties of the polymer phase are not those of virgin material, providing novel characteristics during processing and in the performance of the finished composite structure. Thermoplastics crystallize in the cooling phase and solidify. Solidification for semi-crystalline polymers is largely due to the formation of crystals, creating stiffer regions surrounding the amorphous area of the polymer matrix. When used correctly, mineral fillers can act as nucleating agents, normally at higher temperatures. This process can provide mechanical properties in the polymer composite favorable to high barrier performance and adhesion to fiber surfaces without a detrimental effect on heat sealing characteristics. Minerals can begin to significantly affect crystallinity when used from about 15% to about 70% by weight of the polymer composite. Some of the factors influencing mechanical adhesion to paper include extrudate temperature, oxidation, and penetration into the fibers. Mineral onset temperatures of the polymer extrudate influence cooling rate upon die exit to the nip roller, which can be adjusted by the extruder air gap setting. Other key factors include the mass of the polymers of the polymer interface layer. The crystalline onset temperatures vary, however, examples are shown in Table 4, below.

TABLE 4

Selected Polymers with Estimated Mineral Onset Temperatures

| | |
|---|---|
| Unfilled Polypropylene | 120-122° C. |
| Calcium Carbonate | 120-125° C. |
| Dolomite | 120-131° C. |
| Talc | 120-134° C. |
| Silica | 120-122° C. |
| Mineral Fiber | 120-122° C. |
| Mica | 120-124 |

Further, homogeneous blends of solid olefin polymers with varying densities and melt indexes can be mixed within the mineral composite layer, either interspersed or noninterspersed through coextrusion. The mineral-containing composite layer can be applied and bonded substantially and continuously on at least a fiber-containing layer using extrusion or extrusion lamination, including blown film, cast, or extrusion coating methods. Polymer content of the mineral-containing layer can be used as a tie layer for interspersed and non-interspersed constructions as well as particle bonding agents within each individual layer. These bonding agents or tie layers can include individually, or in mixtures, polymers of monoolefins and diolefins, e.g. polypropylene, polyisobutylene, polybut-1-ene, poly-4-methylpent-1-ene, polyvinylcyclohexane, polyisoprene or polybutadiene, homogeneous mettallocene copolymers, and polymers of cycloolefins, e.g. cyclopentene or norbornene, polyethylene, cross-linked polyethylene, ethylene oxide and high density polyethylene, medium molecular weight high density polyethylene, ultra heavy weight high density polyethylene, low density polyethylene, very low density polyethylene, ultra low density polyethylene; copolymers of monoloefins and diolefins with one another or with other vinyl monomers, e.g. ethylene/propylene copolymers, linear low density polyethylene, and blends thereof with low density polyethylene, propylene but-1-ene, copolymers ethylene, propylene/isobutylene copolymers, ethylene/but-1-ene copolymers, ethylene/hexene copolymers, ethylene/octene copolymers, ethylene/methylepentene copolymers, ethylene/octene copolymers, ethylene/vinylcyclohexane copolymers, ethylene/cycloolefin copolymers, COC, ethylene/l-olefin copolymers, the 1-olefin being produced in situ; propylene/butadiene copolymers, isobutylene/isoprene copolymers, ethylene/vinylcyclohexene copolymers, ethylene vinyl acetate copolymers, ethylene/alkyl methacrylate copolymers, ethylene/acrylic acid copolymers or ethylene/acrylic acid copolymers and salts thereof (ionomers) and terapolymers of ethylene with propylene and diene, such as, for example, hexadiene, dicyclopentadiene or ethylidenenorbornene; homopolymers and copolymers that may have any desired three dimensional structure (stereo-structure), such as, for example, syndiotactic, isotactic, hemiisotactic or atactic stereoblock polymers are also possible; polystyrene, poly methylstyrene, poly alpha-methylstyrene, aromatic homopolymers and copolymers derived from vinylaromatic monomers, including styrene, alpha-methylstyrene, all isomers of vinyl toluene, in particular p-vinyltoluene, all isomers of ethylstyrene, propylstyrene, vinylbiphenyl, vinylnaphthalene and blends thereof, homopolymers and copolymers of may have any desired three dimensional structure, including syndiotactic, isotactic, hemiisotactic or atactic, stereoblock polymers; copolymer, including the above mentioned vinylaromatic monomers and commoners selected from ethylene, propylene, dienes, nitriles, acids, maleic anhydrides, vinyl acetates and vinyl chlorides or acryloyl derivatives and mixtures thereof~ for example styrene/butadiene, styrene/acrylonitrile, styrene/ethylene (interpolymers) styrene/alkymethacrylate, styrene/butadiene/alkyl acrylate, styrene/butadiene/alkyl methacrylate, styrene/maleic anhydride, styrene copolymers; hydrogen saturated aromatic polymers derived from by saturation of said polymers, including polycyclohexylethylene; polymers derived from alpha, beta-unsaturated acids and derivatives; unsaturated monomers such as acrylonitrile/butadiene copolymers acrylate copolymers, halide copolymers and amines from acyl derivatives or acetals; copolymers with olefins, homopolymers and copolymers of cyclic ethers; polyamides and copolyamides derived from diamines and dicarboxylic acids and or from aminocarboxylic acids and corresponding lactams; polyesters and polyesters derived from dicarboxylic acids and dials and from hydroxycarboxylic acids or the corresponding lactones; blocked copolyetheresters derived from hydroxyl terminated polyethers; polyketones, polysulfones, polyethersulfones, and polyetherketones; cross-linked polymers derived from aldehydes on the one hand phenols, ureas, and melamines such as phenol/formaldehyde resins and cross-linked acrylic resins derived from substantial acrylates, e.g. epoxyacrylates, urethaneacrylates or polyesteracrylates and starch; polymers and copolymers of such materials as polybutylene succinate, polymers and copolymers of N-vinylpyrroolidone such as polyvinylpyrrolidone, and crosslinked polyvinylpyrrolidone, ethyl vinyl alcohol. More examples of thermoplastic polymers suitable for the mineral-containing composite include polypropylene, high density polyethylene combined with MS0825 Nanoreinforced POSS polypropylene, thermoplastic elastomers, thermoplastic vulcinates, polyvinylchloride, polylactic acid, virgin and recycled polyesters, cellulosics, polyamides, polycarbonate, polybutylene tereaphthylate, polyester elastomers, thermoplastic polyurethane, cyclic olefin copolymer; biodegradable polymers such as Cereplast-Polylactic acid, Purac-Lactide PLA, Nee Corp PLA, Mitsubishi Chemical Corp GS PLS resins, Natureworks LLC PLA, Cereplast-Biopropropylene, Spartech PLA Rejuven 8, resins made from starch, cellulose, polyhydroxy alcanoates, polycaprolactone, polybutylene succinate or combinations thereof, such as Ecoflex FBX 7011 and Ecovio L Resins from BASF, polyvinylchloride and recycled and reclaimed polyester such as Nodax biodegradable polyester by P & G.

The mineral-containing layer can include coupling agents from about 0.05% to about 15% of the weight of the mineral-containing layer. The agents aid in the mixing and the filling of the mineral into the polymer matrix. Functional coupling groups include (Pyro-) phosphato, Benzene sulfonyl and ethylene diamino. These can be added to thermoplastics including polyethylene, polypropylene, polyester, and ethyl vinyl alcohol, aluminate, siloxane, silane, anlino, malice anhydride, vinyl and methacryl. The results of these combinations improve adhesion to fibers, heat seal strength, heat seal activation temperatures, surface energy, opacity, and cosmetics. Mineral content can include, but is not limited to, wollanstonite, hydrated and non-hydrated, magnesium silicate, barium sulfate, barium ferrite, magnesium hydroxide, magnesium carbonate, aluminum trihydroxide, magnesium carbonate, aluminum trihydroxide, natural silica or sand, cristobalite, diaonite, novaculite, quartz tripoli clay calcined, muscovite, nepheliner-syenite, feldspar, calcium sulfate-gypsum, terra alba, selenite, cristobalite, domite, silton mica, hydratized aluminum silicates, coke, montmorillonite (MMT), attapulgite (AT) carbon black, pecan nut flour, cellulose particles, wood flour, fly ash, starch, $TiO_2$ and other pigments, barium carbonate, terra alba, selenite, nepheline-syenite, muscavite, pectolite, chrysotile, borates, sulfacates, nano-particles of the above from 0.01 to 0.25 micron particle size, and precipitated and ground calcium carbonate. Among, but not limited procedures generally involving the use of polymerization initiators of catalysts for the polymerization of butene-I monomer to polymers of high molecular weight, preferably catalytic systems used in such procedures are the reaction products of metal alkyl compounds such as aluminum triethyl, and a heavy metal compound, such as the trihalides of Groups IV-VI metals of the periodic table, e.g. titanium, vanadium, chromium, zirconium, molybdenum and tungsten. The formation of polymers exhibiting substantial isotactic properties as wells as the variations in the molecular weight and the nature of the polymerization catalyst, co-reactants, and reaction conditions. Suitable, but not limited to, isotatic polybutylenes are relatively rigid at normal temperatures but flow readily when heated, and they most preferably, should show good flow when heated, expressed in melt:flow. Applicable isotatic polybutylenes should show a melt flow of from 0.1 to 500, preferably 0.2 to 300, more preferably from 0.4 to 40, most preferably 1 to 4. Other polymers expressed within the contents of the present specification should also be considered within these parameters.

Regarding the mineral-containing composite layer, upon substantially and continuously bonding to the fiber-containing using extrusion coating or extrusion lamination techniques, the layer of which can then be used to form a laminated structure of which the mineral-containing layer can be used as a peel coat onto a desired backing material. The best peel seal, for example, to the mineral-containing layer of the composite, may be selected from poly-4-methyl pentene, nylon, high-density polyethylene (HDPE), aluminum foil, polycarbonate polystyrene, polyurethane, polyvinyl chloride, polyester, polyacrylonitrile, polypropylene (PP), and paper. An example extrusion process can be accomplished with a screw or pneumatic tube. Sometimes the mineralized polymers can be combined with such materials as plasticizers lubricants, stabilizers, and colorants by means of Banbury mixers. The resulting mix is then extruded through rod shaped dies and chipped into pellets. Pelletized mineralized polymer can then enhance the mineral and other content by "letting down" the resin pellet mix with inline or offline mixing capability before being fed into the end of a, for example, screw-type extruder, heated, and mixed into a viscous fluid or semi-fluid in the extruder barrel for further processing to the die. Further, when properly dispersed the interaction between the mineral particles and the polymer content without covalent bonding, results in improved van der Waals forces that provide attraction between the materials. This interaction results in some adhesion in the composite during extrusion, resulting in an absorbed polymer layer on the filler surface. These considerations combined with the unique attributes of the mineral content dispersed within the polymeric matrix of both monolayer and multilayer mineral composite layers impact the application of heat that initiates the melting of semi-crystalline polymers, causing the polymer molecules to better diffuse across the interface. Given sufficient time, the diffused polymers form entanglements at the inter-facial layer. This effect is possible at extrusion line speeds from up to about 100 FPM and extrusion lamination up to about 3,500 FPM, using semi-crystalline mineralized resin blends with extrusion equipment die and barrel zone temperatures from about 540 degrees to about 615 degrees F. Because of improved mineral thermal properties, oxidation of the extrudate upon exiting the die but before fiber contact improves from about 10-50%, thus greatly strengthening fiber bonding characteristics under normal equipment operating conditions.

Molecular weight ranges of the polymer bonding agent component of the mineral containing layer are from about Mw 10,000 to about Mw 100,000. Further, about 10%-70% of the polymer bonding agent may have a branching index (g') of about 0.99 or less as measured at the Z-average molecular weight (Mz) of the polymer. Some, part, or all of the mineral containing layer polymer bonding agent is preferred but not required to have an isotactic run length of from about 1 to about 40. Further, the polymer bonding agent of the mineral containing layer has a shear rate range of from about 1 to about 10,000 at temperatures from about 180° C. to about 410° C.

TABLE 5

Particle characteristics of $CaCO_3$

| Particle Coating | Fatty Acids Including Stearates |
|---|---|
| Hunter Reflectance (Green) | 91-97% |
| Hunter Reflectance (Blue) | 89-96% |
| Mohs Hardness | 2.75-4.0 |
| pH in Water, 5% Slurry, 23° C. | 8.5-10.5 |
| Resistance in Water, ohms, 23° C. | 5,000-25,000 |
| ASTM D1119 Max % on 325 Mesh | 0.05-0.5 |
| Volume Resistivity @ 25° C. | $10^9$-$10^{11}$ ohms |
| pH | 8.5-10.5 |
| Standard Heat of Formation, $CaCO_3$ from its Elements 25° C. | 288.45-288.49 Kg-cal/mole |
| Standard Free Energy of Formation, $CaCO_3$ from its Elements 25° C. | 269.53-269.78 Kg-cal/mole |
| Specific Heat (between 0 to 100° C.) | 0.200-0.214 |
| Heat Conductivity | 0.00071 g · ca/ sec · $cm^2$ · 1 cm thick @ 25° C. |
| Coefficient of Linear Expansion | C = 9 × $10^{-6}$ @ 25 to 100° C. C = 11.7 × 10 @ 25 to 100° C. |

Also, nano-cellulose can be used in the mineral-containing composite layer having a crystalline content from about 40%-70%, including nano-fibrils, micro-fibrils, and nanofibril bundles, having lateral dimensions from about 0.4-30 nanometers (nm) to several microns, and highly crystalline nano-whiskers from about 100 to 1000 nanometers. Nano-cellulose fiber widths are from about 3-5 nm and from about 5-15 nm, having charge densities from about 0.5 meq/g to about 1.5 meq/g, with the nano-cellulose having a stiffness from about an order of 140-220 GPa and tensile strength from about 400-600 MPa.

The mineral-containing interspersed or non-interspersed polymer composite layer can be substantially and continuously directly bonded to a fiber surface or to the fiber surface interface adhesive layer using extrusion coating or extrusion lamination. Further, the fiber containing layer can contain inorganic mineral coatings and fillers, e.g. clay, kaolin, $CaCO_3$, mica, silica, $TiO_2$ and other pigments, etc. Other materials found in the fiber-containing layer include vinyl and polymeric fillers and surface treatments such as starch and latex. Preferred characteristics of the fiber-containing layer bound to the mineral-containing layer include, but are not limited to, a smoothness range of about 150 to about 200 Bekk seconds, and an ash content from about 1% to about 40% by weight. Also, in this example, the fiber-containing layer coefficient of static friction, $\mu$, is from about 0.02 to about 0.50. Identified cellulose within the fiber-containing layer preferably has a thermal conductivity from about 0.034 to about 0.05 W/m·K. If using air-laid paper or non-woven fibers, the fiber content is preferably from about 40% to about 65% of the layer by weight. Other preferred, but not limiting, characteristics of the fiber-containing layer are shown in Table 6, below.

TABLE 6

Fiber Layer Characteristics

| | |
|---|---|
| Fiber Aspect Ratio (Average) | 5-100 |
| Fiber Thickness (Softwood) | 1.5-30 mm |
| Fiber Thickness (Hardwood) | 0.5-30 mm |
| Filled Fiber Content | 1% to 30% |
| Fiber Density | 0.3-0.7 g/cm2 |
| Fiber Diameter | 16-42 microns |
| Fiber Coarseness | 16-42 mg/100 m |
| Fiber Pulp Types (Single- to Triple-Layered) | Mechanical, Thermo-Mechanical, Chemi-Thermo-Mechanical, and Chemical |
| Permeability | 0.11-110 $m^2 \times 10^{15}$ |
| Hydrogen Ion Concentration | 4.5-10 |
| Tear Strength (Tappi 496, 402) | 56-250 |
| Tear Resistance (Tappi 414) | M49-250 |
| Moisture Content | 2%-18% by Weight |

Coextrusion methods provide the possibility for non-interspersed contact layers within the mineral-containing layer. Based on performance and structural requirements, the finished composite structures can contain separate layers in the composite that can vary based on types of mineral and amount of mineral content per layer, degrees of amorphous and crystalline content per layer, and type of polymer resin and resin mixes per layer. The more extruders feeding a common die assembly, the more layered options become available to the noninterspersed mineral-containing layer. The number of extruders depends on the number of different materials comprising the coextruded film. For example, a non-interspersed mineral containing composite may comprise a three-layer to six-layer coextrusion including a barrier material core that could be, for example, a high density polyethylene and low density polyethylene mix having a 25% to 65% mineral content by weight in the first base layer, this layer making contact with the fiber surface. Subsequent layers may contain differing mineral contents, neat LDPE, or polypropylene. Another example is a six-layer coextrusion including a bottom layer of LDPE, a tie-layer resin, a 20% to 65% mineral-containing polypropylene barrier resin, a tie-layer, and an EVA copolymer layer, and a final layer of polyester. Any mineral containing barrier layer according to the present embodiments may have a basis weight from about 4 lbs/3 msf to about 60 lbs/3 msf, a density from about 1.10 g/cm$^3$ to about 1.75 g/cm$^3$, and/or a caliper from about 0.30 mil to about 3 mil. Tie-layers often are used in the coextrusion coating of multiple layer constructions where mineral-containing polymers or other resins would not bond otherwise, and tie-layers are applied between layers of these materials to enable desired adhesion. Another example multilayer film construction is 25%-65% mineral content LLDPE/tie-layer/EVOH barrier/tie-layer/EVA. Interspersed, e.g. monolayer, and noninterspersed, e.g. multilayer, coextrusions can comprise from one to six layers of the mineral containing layer substantially and continuously bonded across the surface of a fiber-containing layer. Layers can be designed to improve hot tack, heat-sealability, seal activation temperature, and extrudate adhesion to fiber, mineral enhancement of barrier performance, surface energy, hot and cold glue adhesion improvements, etc.

Table 7, below, shows example layer constructions (not limited to) found in the mineral-containing resin and extrusion coated or laminate composite structure. The preferred single layer ranges contain from about 0% to about 65% by weight mineral content, from 25%-80% amorphous to 25%-80% crystalline structure by weight, and 25%-65% cellulose, nanocellulose, or nano-minerals by weight. Also, the mineral content of the mineral-containing layer(s) may comprise different fillers with different densities, size, and shape depending upon the desired outcome of the final composite structure.

TABLE 7

Examples of Non-Interspersed (Multilayered) Mineral Composite Layers

| Layer Structure | Example 1 | Example 2 | Example 3 | Example 4 | Example 5 | Example 6 |
|---|---|---|---|---|---|---|
| Monolayer (1) | LDPE | HDPE | LDPE-HDPE resin blend | LDPE-MMW HDPE resin blend | LLDPE-LDPE resin blend | PLA-bio derived starch based resin blend |

TABLE 7-continued

Examples of Non-Interspersed (Multilayered) Mineral Composite Layers

| Layer Structure | Example 1 | Example 2 | Example 3 | Example 4 | Example 5 | Example 6 |
|---|---|---|---|---|---|---|
| Monolayer (2) | Bio-derived, starch polymer blend | LDPE-bio derived starch polymer blend | LDPE-LLDPE-bio derived starch blend | LDPE-HDPE-LLDPE blend | PP-bio derived starch based polymer blend | ULDPE-HDPE-bio derived starch polymer blend |
| 3-layer | HDPE-LDPE | HDPE-PP | HDPE-PET | LDPE-PP | LLDPE-PET | EVA-LDPE |
| 4-layer | EVA-ethylene vinyl acetate EEA-ethylene acrylic acid-HDPE-EAA ethylene acrylic acid | HDPE-EVA-Ionomer resin-Polyamides- | Biaxially oriented homopolypropylene-polyester-polypropylene-PE | Oriented polypropylene-HDPE-PE-metallized PET | EVA-PE-MMWHDPE-oriented polypropylene | PVC-ABS-PC Nylon |

Additionally, if relative clarity is desired in the mineral-containing composite layer the following resins are possible, but not limiting, bonding agents for these materials: carboxy-polymethyelene, polyacrylic acid polymers and copolymers, hydroxypropylcellulose, cellulose ethers, salts for poly(methyl vinyl ether-co-maleic anhydride), amorphous nylon, polyvinylchloride, polymethylpentene, methyl methacrylate-acrylonitrile-butadiene-styrene, acrylonitrile-styrene, poly carbonate, polystyrene, poly methylacrylate, polyvinyl pyrrolidone, poly (vinylpyrrolidone-co-vinyl acetate), polyesters, parylene, polyethylene naphatalate, ethylene vinyl alcohol, and poly lactic acids containing from about 10% to about 65% mineral content. Various mineral-containing layer polymer and mineral content can be determined based upon performance and content requirements considering the parameters shown in Table 7, above. Branched, highly branched, and linear polymer combinations are possible in all composite layer constructions. Examples are shown in Table 7 (not limited to combinations within the table) of the interspersed and non-interspersed mineral-containing layer constructions, not including tie layers. Layer combinations depend on coextrusion die design, flow properties, and processing temperature, allowing for coextrusion fusion layers and/or subsequently extrusion laminating or laminating the layers into the final mineral-containing composition, of which individual (non-interspersed) or total combination of layers have by weight mineral content of about 20%-65%. Layers can be uniaxially or biaxially oriented (including stretching) from about 1.2 times to about 7 times in the machine direction (MD) and from about 5 times to about 10 times in the cross-machine (transverse) direction (CD), and stretched from about 10% to about 75% in both the MD and CD directions. Generally, although without limitation, polyolefin mineral content bonding agents have number average molecular weight distributions (Mn) of from about 5,500 to about 13,000, weight average molecular weight (Mw) of from about 170,000 to about 490,000, and Z average molecular weight (Mz) of from about 170,000 to about 450,000. A coextruded mineral-containing layer may differ in molecular weight, density, melt index, and/or polydispersity index within the finished layer structure. The polydispersity index is the weight average molecular weight (Mw) divided by the number average molecular weight (Mn). For example only, and without limitation, the mineral-containing layer may have a Mw/Mn ratio of from about 6.50 to about 9.50. Using wet or dry ground $CaCO_3$ as an example, it can be surface treated at levels from about 1.6 to about 3.5 mg surface agent/$m^2$ of $CaCO_3$. The surface treatment can be applied before, during, or after grinding. Mean particle sizes range from, without limitation, about 0.7 microns to about 2.5 microns, having a top cut from about d98 of 4-15 microns, and a surface area of from about 3.3 $m^2$/g to about 10.0 $m^2$/g. For improved dispersion into the polyolefin bonding agent, the $CaCO_3$ mineral content can be coated with fatty acids from between, without limitation, about 8 to about 24 carbon atoms.

The preferred surface treatment range is about 0.6% to about 1.5% by weight of treatment agent or about 90%-99% by weight of $CaCO_3$. Polyolefin bonding agents having lower molecular weights and high melt index provide improved downstream moisture barrier characteristics. Preferred mineral layer content could include finely divided wet ground marble with 65% solids in the presence of a sodium polyacrylate dispersant, dried, and surface treated, and also dispersant at 20% solids, dried, and surface treated.

Testing methods for measuring moisture vapor transmission rates and water vapor transmission rates (MVTR/WVTR) often involve tropical conditions (100° F. and 90% RH) according to TAPPI Test Method T-464, orienting the barrier coating toward the higher humidity of the chamber atmosphere, when it is present on the surface. For water resistance, the standard short (2 minute) and long (20 minute) Cobb test is often used. For oil, two tests are commonly used. The first is the 3M kit test per TAPPI T-559 standards, coating film weight as measured by TAPPI 410 standards. The second is red dyed canola oil and castor oil exposure to the coating surface using a 2-minute and a 20-minute Cobb ring.

Extruded mineral-containing interspersed and non-interspersed composite layers of the present embodiments demonstrate high barrier performance characteristics when substantially and continuously bonded to fiber-containing layers. The fiber-containing layers may include in their composition or surface, but are not limited to, mineral and polymeric sizings, surface treatments, coatings, and mineral fillers. Some advantages of the non-fiber content of the fiber-containing layer include improved fiber layer printability, ink hold out, dynamic water absorption, water resistance, sheet gloss, whiteness, delta gloss, pick strength, and surface smoothness. Often, mineral content contained within or upon one or more opposing surfaces of the fiber-containing layer can include, but is not limited to, clay, calcined clay, or combinations thereof. The minerals are frequently applied to the surface of the fiber-containing layer through a blade or air coating process. Common mineral binding methods include the use of protein systems such as a mixture of vinyl acrylic/protein co-binders. Another non-limiting example is tri-binder systems, e.g. SB/Pvac/Protein. Further, pigments such as $TiO_2$ can be included to improve whiteness characteristics. The nature of the fiber layer's mineral and binder content can impact the selection of the non-interspersed and interspersed mineral-containing layer characteristics when bonded substantially and continuously to one or more sides of the fiber-containing layer(s), which comprise part of the composite structure. Examples of non-fiber content in the fiber-containing layer include, but are not limited to, 50%-95% of #1 clay or #1 fine clay, 3%-20% by part calcined clay, 3%-40% by part Ti02, 2%-45% vinyl acrylic, and from about 1% to about 35% protein binders, co-binders, or tri-binders.

Also, the fiber-containing layer surfaces can have from about 55% to about 88% TAPPI 452 surface brightness. The examples shown in Table 8, below, illustrate acceptable, but not limiting, fiber-containing layer characteristics for substantially and continuously bonding to the mineral-containing layer. Surface roughness values are based upon Parker Print Surf (μm) and Bendtsen (mls/min) per TAPPI T-479 (moderate pressure), TAPPI T-538, and TAPPI 555 (printsurf method). Tear resistance per TAPPI T-414 standards are expressed in millinewtons (mN). Surface brightness is expressed per TAPPI 452. Burst strength is expressed per TAPPI 403 standards. Bursting strength is reported as burst ratio=bursting strength ($lbs/in^2$/basis weight (lbs/ream). Internal bond strength or interlayer strength of the fiber-containing layer is an important characteristic as represented by TAPPI T-403 and T-569. Preferred fiber-containing layer internal strengths are, but are not limited to, from about 125 J/m2 to about 1150 $J/m^2$. Further, fiber-containing layer Z-direction tensile strength per TAPPI T-541 testing standard is from about 45-50 Nm/g to about 950 Nm/g. Finally, preferred, but non-limiting, fiber containing layer air resistance per TAPPI 547 is from about 0 to about 1500 mls/min, as represented by the Bendsten method.

TABLE 8

Fiber-Containing Layer Characteristics

| Fiber Weight (lbs/3 msf) | $g/m^2$ | Tear Resistance (Mn) | Surface Roughness | Burst Strength (kPa) |
| --- | --- | --- | --- | --- |
| 40-75 | 60-110 | 400-700 | 2.0-5.5 μm | 140-300 |
| >75 | 110-130 | 650-700 | 2.0-3.5 μm | 175-400 |
| >115 | 180-190 | 1400-1900 | 100-2500 mls/min | 175-475 |
| >130 | 205-215 | 1600-2200 | 100-2500 mls/min | 250-675 |
| >200 | 315-330 | 1900-3200 | 100-2500 mls/min | 500-950 |
| >300 | 460-195 | 500-4000 | 100-2500 mls/min | 700-1850 |

Table 9, below, displays finished composite board barrier performance ranges, but is not limited to, that of a composite structure having from about 20% to about 70% mineral-containing layer bonded to at least one side of a fiber-containing layer. The mineral-containing layer can be either a dispersed monolayer or non-interspersed coextrusion, for example.

TABLE 9

Barrier Values of Formed Composite Structure

| Test Method | | TAPPI T441 | TAPPI T464 | | TAPPI T410 | | TAPPI T559 | |
| --- | --- | --- | --- | --- | --- | --- | --- | --- |
| Test Name | | Cobb Water Absorption | WVTR in Tropical Conditions | | Mineral layer Wgt | | Grease Resistance | |
| units | | $g/m^2$ | $g/m^2$ | g/100 $in^2$ | $g/m^2$ | lb/1000 $ft^2$ | 3M Test Kit # | |
| Sample # | Fiber Layer | 2 minute Cobb | 30 minute Cobb | | | | Coated Side | Uncoated Side |
| 1 | Recycled Fiber | .28 mil caliper | 0.22 | — | 23.4 | 1.51 | | *12 | **1- |
| 2 | Virgin Fiber | .20 mil caliper | 0.40 | 0.00 | 15.2 | 0.98 | 32.3 | 4.12 | 12 | 1- |
| 3 | Recycled Fiber | .20 mil caliper | 0.00 | — | 18.6 | 1.20 | | 3.45 | 12 | 1- |
| 4 | 85-100% Recycled Fiber | .20 mil caliper | 0.10 | 0.05 | 13.9 | 0.89 | 18.25 | 3.55 | 12 | 1- |

TABLE 9-continued

Barrier Values of Formed Composite Structure

| # | Description | Caliper | | | | | | | | |
|---|---|---|---|---|---|---|---|---|---|---|
| 5 | Virgin-TMP content | .30 mil caliper | — | — | 7.58 | 0.49 | | | 12 | 1- |
| 6 | Clay coated 1 side-bleached | .18 mil caliper | — | 0.45 | 7.13 | 0.46 | | 7.5 | 12 | 1- |
| 7 | Fiber 2-side bleached | .18 mil caliper | 0.00 | — | 9.31 | 0.6 | | 6.44 | 12 | 1- |
| 8 | Fiber 1 side, bleached | .18 mil caliper | 0.50 | 0.11 | 37.7 | 2.43 | | 11.33 | 12 | 1- |
| 9 | Virgin Craft-clay coated | .16 mil caliper | 0.05 | 0.11 | 15.0 | 0.97 | | 3.94 | 12 | 1- |
| 10 | Virgin Craft-clay coated | .14 mil thick | 0.00 | 0.10 | 14.1 | 0.91 | 28.1 | 3.89 | 12 | 1- |
| 11 | Clay coated, unbleached Kraft-100% virgin | .18 mil caliper | 0.00 | 0.05 | 13.0 | 0.84 | | 6.2 | 12 | 1- |
| 12 | Solid Unbleached Sulfate | .18 mil caliper | 0.00 | 0.00 | 9.49 | 0.61 | 52.2 | 5.5 | 12 | 1- |

Note: 1 mil = 1/1000th of an inch

Table 10, below, shows the barrier performance of a formed composite having a monolayer HDPE-PE mix with a density from about 0.925 gm/cm$^3$ to about 0.960 g/cm$^3$ and containing from about 36% to about 45% mineral content by weight.

TABLE 10

Barrier Values of a Formed Composite Structure, Interspersed (Mono), Mineral Containing Layer

| Fiber Type | Cobb Water Absorption | | WVTR in Tropical Conditions 100° F./90% R.H. | Mineral layer weight | |
|---|---|---|---|---|---|
| Unit | g/m$^2$ | | g/100 in$^2$ | g/m$^2$ | lb/1000 ft$^2$ |
| Sample | 2-min | 30-min | | | |
| Recycled | 0.2 | 0.1 | 16.7 | 1.08 | 24.9 | 5.09 |
| Recycled | 0.0 | 0.0 | 9.7 | 0.63 | 49.6 | 7.4 |
| Virgin Kraft | 0.0 | 0.1 | 11.1 | 0.72 | 32.8 | 6.73 |
| Virgin Kraft | 0.1 | 0.1 | 9.9 | 0.64 | 36.9 | 7.57 |
| Virgin Kraft | 0.0 | 0.1 | 8.7 | 0.56 | 36.2 | 7.42 |
| Virgin Kraft | 0.0 | 0.2 | 7.8 | 0.50 | 41.0 | 6.46 |
| Virgin Kraft | — | — | — | — | 26.1 | 5.35 |

Table 11, below, shows projected moisture barrier performance (MVTR, WVTR) for the present embodiments, comparing a coextruded mineral-containing layer bonded to a surface of a fiber-containing layer, the mineral-containing layer having both a monolayer and a multilayer (coextrusion) construction. The fiber-containing layer in Table 11 lists Klabin virgin Kraft fiber. However, the data is applicable to a range of both virgin and recycled fiber surfaces to include similar various weights and densities known in the art. Maximum MVTR via coextrusion is projected to be about the values in Table 11 in mineral-containing layers down to about 12 g/m$^2$ layer weight. The data illustrates two different MVTR values. The first value is coextrusion. Coextrusion can provide superior results because of the flexibility to alter the type of polymers used per layer, density, branched or linear molecular nature, as well as crystallinity, among others. Also, because of stress fracturing found in more monolayer constructions as a result of bending, scoring, and processing, performance improvements using coextrusion are possible. The base layer in the coextrusion can be more dense and crystalline, for example, than the outer layer, which is more amorphous and light density and more linear, thus not as vulnerable to stress fracture within the matrix, preventing percolation through the layer. Other options for improving processing include additives to the mineral-containing blend, which include, but are not limited to, elastomers.

TABLE 11

Barrier Attributes of Mineral-Containing Layer Bonded to Fiber-Containing Layer Based for Interspersed (Monolayer) and Non-Interspersed (Coextruded)

| Project Barrier Performance Table | | Composite Fiber Layer - Outer layer | | Flat Samples Pre Score + Bed | | Full Case Post Score | | Mineral Layer Weight | |
|---|---|---|---|---|---|---|---|---|---|
| Ethylene Co-Polymer | | Uncoated | Mineral | Ranges WVTR-Tropical | | WVTR | WVTR | Ranges | |
| Mineral Layer Density - - - % Amorphous Range | | Box board | 38-65% | gm/m2 day | Variation | gm/m2 day | Variation | | |
| 1.22-1.41 g/cm3 | 25%-65% | 20 pt. Klabin | 2+ layer coex | 5 to 13 | 0.20 | 11 to 17 | 0.2 | 15 gsm | 50 gsm |
| 1.22-1.36 g/cm3 | 25-70% | 20 pt. Klabin | Monolayer | 8 to 22 | 0.2 | 14 to 25 | 0.2 | 15 gsm | 50 gsm |

Figure 1A:
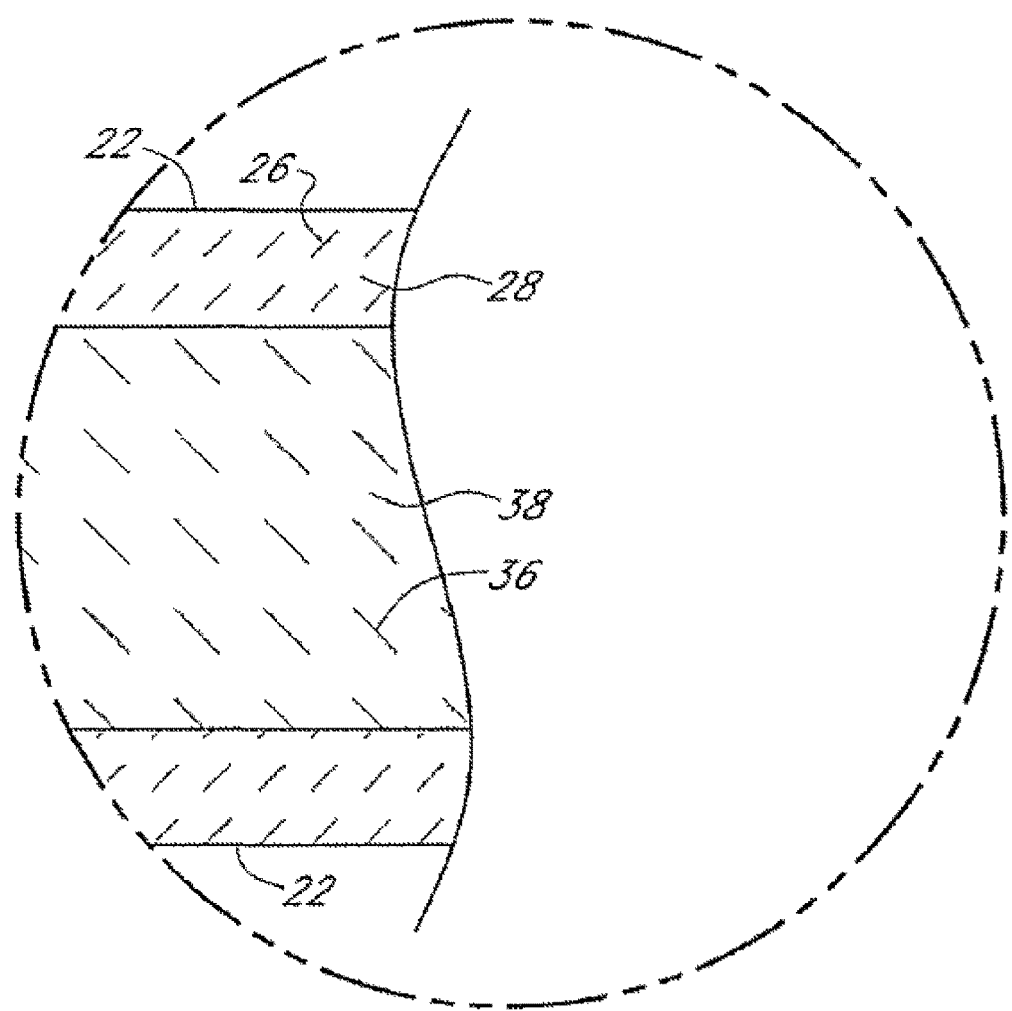
FIG. 1A is a detail view of the portion of FIG. 1 indicated by the circle 1A-1A.

FIG. 1 is a schematic side cross-sectional view of a multilayer repulpable packaging composite material 20 according to the present embodiments. The illustrated embodiment includes a mineral-containing layer 22 having an outer or heat-sealable surface 24. FIG. 1A is a detail view of the portion of FIG. 1 indicated by the circle 1A-1A. As shown in FIG. 1A, a plurality of mineral particles 26 are interspersed within a bonding agent 28, which may be a thermoplastic. With reference to FIG. 1, the mineral-containing layer 22 may be substantially and continuously bonded to a first surface 30 of a fiber-containing layer 32. Another mineral-containing layer 22 may be substantially and continuously bonded to a second surface 34 of the fiber-containing layer 32, the second surface 34 being opposite the first surface 30. With reference to FIG. 1A, the fiber-containing layer 32 includes a plurality of fiber particles 36 interspersed within a bonding agent 38, which may be a thermoplastic. The thermoplastic bonding agent of either or both of the mineral-containing layer 22 and the fiber-containing layer 32 may comprise, for example and without limitation, polyolefin, polyester, or any other thermoplastic or polymer-containing resins.

The mineral-containing layer(s) 22 may include about 30% to about 65% minerals, and the minerals may comprise any of the minerals described throughout this specification and combinations thereof. The mineral-containing layer(s) 22 may be adhered to the fiber-containing layer 32 through coextrusion, extrusion-lamination, or any other suitable method or process. Extrusion-lamination may comprise a separately applied adhesive between the mineral- and fiber-containing layers. The composite material 20 illustrated in FIG. 1 may advantageously be used as a single or multiple corrugate liner(s) or medium(s) within a single layered or multilayered conjugated structure.

Figure 2:
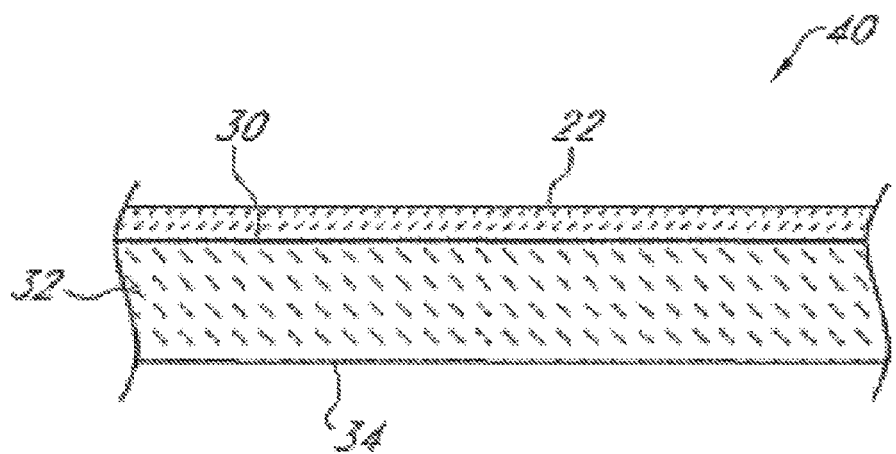
FIG. 2 is a schematic side cross-sectional view of another multilayer repulpable packaging composite material according to the present embodiments.

FIG. 2 is a schematic side cross-sectional view of another multilayer repulpable packaging composite material 40 according to the present embodiments. The illustrated embodiment includes a mineral-containing layer 22 substantially and continuously bonded to the first surface 30 of a fiber-containing layer 32. In contrast to the embodiment of FIG. 1, in the embodiment of FIG. 2 the second surface 34 of the fiber-containing layer 32 is not bonded to a mineral-containing layer 22.

Figure 3:
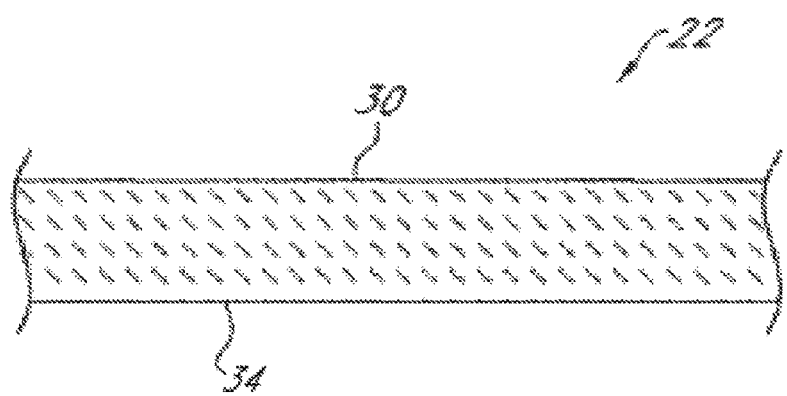
FIG. 3 is a schematic side cross-sectional view of a repulpable mineral-containing material according to the present embodiments.

FIG. 3 is a schematic side cross-sectional view of a repulpable mineral containing material according to the present embodiments. The illustrated embodiment includes a mineral-containing layer 22 having both the first and second surfaces 30, 34 uncovered by a mineral-containing layer 22.

Figure 4:
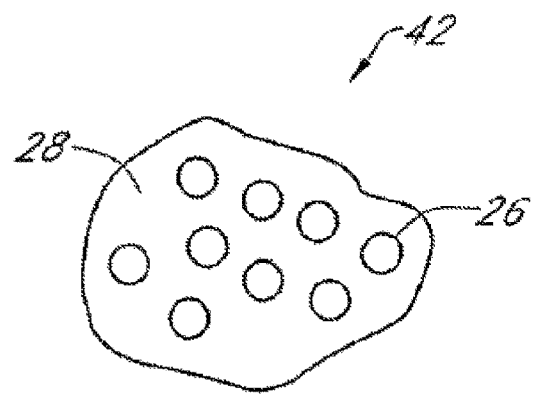
FIG. 4 is a schematic detail view of a pellet of a mineral-containing resin with mineral particles interspersed within a bonding agent according to the present embodiments.

FIG. 4 is a schematic detail view of a pellet 42 of a mineral-containing resin with mineral particles interspersed within a bonding agent, according to the present embodiments. Pellets such as that illustrated in FIG. 4 may be used in an extrusion process to adhere the mineral-containing layer 22 and the fiber-containing layer 32 to one another. With reference to FIG. 4, the mineral particles 26 are interspersed within the bonding agent 28 within the pellet 42.

Figure 5:
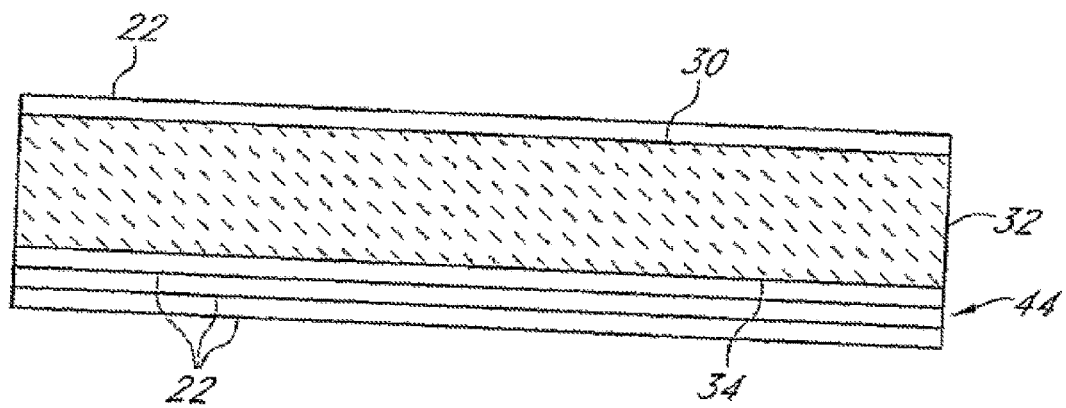
FIG. 5 is a schematic side cross-sectional view of another multilayer repulpable packaging composite material according to the present embodiments.

FIG. 5 is a schematic side cross-sectional view of another multilayer repulpable packaging composite material according to the present embodiments. The illustrated embodiment includes a first mineral-containing layer 22 substantially and continuously bonded to the first surface 30 of a fiber-containing layer 32. A second mineral-containing layer 44 is substantially and continuously bonded to the second surface 34 of the fiber-containing layer 32. The second mineral-containing layer 44 comprises three layers or plies of the first mineral containing layer 22. The first and second mineral-containing layers 22, 44 may be secured to the fiber-containing layer 32 through any of the processes described herein, such as coextrusion, extrusion-lamination, etc., or through any other process. The plies 22 of the second mineral containing layer 44 may be secured to one another through any of the processes described herein, such as coextrusion, extrusion-lamination, etc., or through any other process. One or more of the plies 22 may comprise a mineral content and/or a bonding agent that is different from the mineral content and/or the bonding agent of another one or more of the plies 22. Further, the illustrated embodiment in which the second mineral-containing layer 44 comprises three layers or plies 22 is only one example. In other embodiments the second mineral-containing layer 44 may have any number of layers or plies 22, such as two layers or plies, four layers or plies, five layers or plies, etc. In yet further embodiments, the fiber-containing layer 32 may have a multilayer mineral-containing layer 44 adhered to both the first and second surfaces 30, 32.

Figure 6:
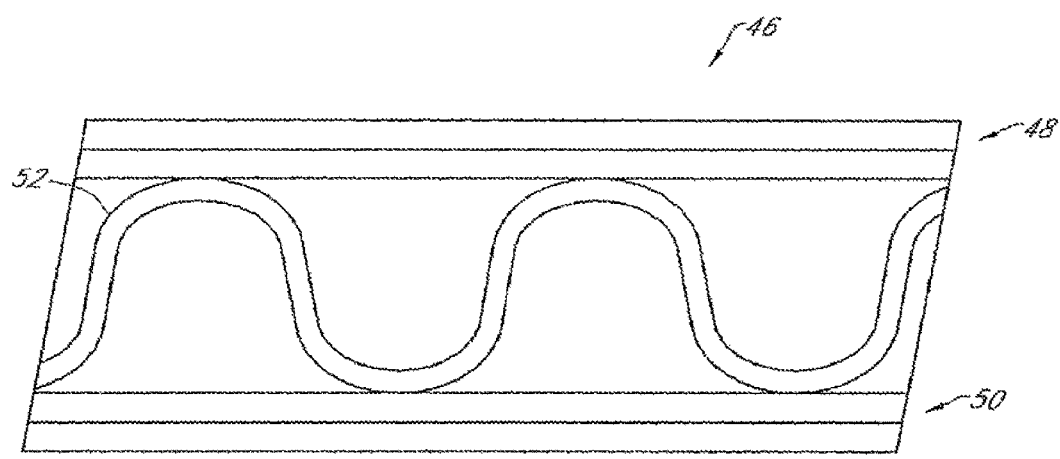
FIG. 6 is a schematic side cross-sectional view of another multilayer repulpable packaging composite material according to the present embodiments.

FIG. 6 is a schematic side cross-sectional view of another multilayer repulpable packaging composite material 46 according to the present embodiments. The material 46 of FIG. 6 includes multiple layers of any of the material layers described herein, such as a first dual layer 48 and a second dual layer 50 with a corrugated layer 52 there between.

The composite materials illustrated in the foregoing figures and described above are well-suited for use as packaging materials, such as for packages for containing one or more products. For example, and without limitation, such packages may comprise folding cartons and/or boxes. The package material has high performance heat seal characteristics, elevated barrier performance, is repulpable, and provides excellent cosmetics and favorable economics. The present composite materials can also be used as components, or layers, of multilayer packaging structures, such as corrugated boxes, and/or be used as a single-layer or multilayer corrugated liner or medium.

EXAMPLE 1

To form a repulpable composite, a 38.5% by weight mineralized HPDE-PE resin containing additives was compounded using wet ground and coated for dispersion finely ground within a range of about approximately 5-14 micron mean particle sized limestone-originating $CaCO_3$ particles with incremental crystalline silica content within a range of from about 0.2% to about 3.5%. The specific heat of the ground $CaCO_3$ particles was from about 0.19 to about 0.31 kcal/kg·° C. The HDPE had a density within a range of about 0.939 to about 0.957 $g/cm^3$ and the PE had a density of from about 0.916 $g/cm^3$ to about 0.932 g/cm3. The HDPE-PE bonding agent had a melt flow index of 14 g/10 minutes. The finished and pelletized mineralized compound had an approximate density within a range of about of 0.125 to about 1.41 $g/cm^3$. The compound was coextruded using the mineralized HDPE-PE composite layer as a base layer applied at 22 $g/m^2$ coating thickness contacting the uncoated side of 320 g/m2 weight Klabin virgin paper surface having a TAPI T-441 Sheffield Smoothness of 74, a 7.5% moisture content, and a TAPPI T 556 MD-CD Taber Stiffness of 39.9 and 17.4, respectively. The minor layer, or top facing, outer, polymer bonding agent mineral-containing layer of the coextrusion was about 8 $g/m^2$ weight having a mineral content from about 4% to about 65%, the base layer being predominately crystalline using the top layer to provide additional moisture barrier at box bend, scoring, and folding joints. The extrusion processing condition melt temperature for the base layer was within a range of approximately 560° F. to 610° F. with barrel temperatures from zone one to zone six from about 405° F. to 600° F. Base layer die temperature zones were approximately 575° F. to 600° F. The extruder die gap setting was within the range of 0.025"-0.046". Unfilled Westlake® brand top neat PE mineral-containing layer processing was consistent with neat LDPE. The extruder air gap was approximately 4"-10", providing sufficient base layer oxidation and excellent adhesion use gas pre-heat, but without ozone or primer layers. The extrusion line speeds were within the range of 150-600 meters per minute across a fiber web with within 50"-118" range. Post corona treatment was used. Roll stock was in-process quality control checked for adhesion using "tape" testing and saturated for pin holing. Coat weight testing was done consistently using lab instrumentation. Finished and coated roll stock was rewound and sent for converting. Successful converting and packaging article forming, e.g. folding cartons/boxes, were done up to eight months post-extrusion coating. Using room temperature adhesives during converting, the roll stock was run on high speed detergent box production lines at speeds from about 100 to 500 cartons per minute. The enclosed detergent, being sensitive to moisture exposure, was shipped in tropical moisture conditions. Glue seams and small, medium, and large carton sizes were successfully formed having sufficient fiber tear, meeting standards with both room temperature and hot melt adhesives, including the manufacturer's seam. Moisture barrier testing was completed for large size sampling sizes, which included full converted and formed case samples having MVTR performance of 13.91 g/m2/24 hours with a minimum of 13.03 $g/m^2$/24 hours, with a standard deviation of 0.86. These results compared to 40 $g/m^2$ inline primed and then applied aqueous PVDC coatings on the same Klabin board having an average MVTR of 18.92 $g/m^2$/24 hrs with a minimum of 16.83 $g/m^2$/24 hours, a maximum of 20.89 $g/m^2$/24 hrs, with a standard deviation of 2.00, and also compared to 20 micron thick BOPP primed and roll-to-roll laminated on the same Klabin board having an average MVTR of 15.03 $g/m^2$/24 hrs with a minimum of 13.20 $g/m^2$/24 hrs, a maximum of 16.6 $g/m^2$/24 hrs, with a standard deviation of 1.41.

EXAMPLE 2

To form a repulpable and recyclable composite, a 43.5% by weight mineralized PE resin containing additives was compounded using wet ground and coated with fatty acid containing materials for dispersion and finely ground approximately 4-12 micron mean particle sized limestone-originating $CaCO_3$ particles with incremental crystalline silica content of less than from about 0.2% to about 5%. The resin blend also had 5% by weight titanium dioxide ($TiO_2$) for a total mineral content of from about 48.5% by weight. The specific heat of the ground $CaCO_3$ particles was 0.21 kcal/kg·° C. The PE had a density of 0.919 $g/cm^3$ to about 93.1 $g/cm^3$. The PE bonding agent had a melt flow index of 16 g/10 minutes. The finished and pelletized mineralized compound had an approximate density of 1.38 $g/cm^3$. The compound was then extruded using the mineralized PE and $TiO_2$ composite layer as a mono layer applied at 32 lbs/3 msf coating weight contacting the uncoated side of Rock Tenn AngelCote® approximately 100% recycled fiberboard with a nominal basis weight of 78 lbs/msf, with the paper surface having a TAPPI T-441 Sheffield Smoothness of approximately 68-72, a 5% to 7.5% moisture content, and a TAPPI T 556 MD-CD Taber Stiffness g-cm of 320 and 105, respectively. The extrusion processing condition melt temperature was approximately 585° F. with barrel temperatures from zone one to zone six from about 400° F. to about 585° F. Die temperature zones were approximately 575° F. to 585° F. The extruder die gap setting was within the range of 0.025"-0.030". The extruder air gap was approximately 6"-10", providing excellent extrudate to fiber adhesion without a gas pre-heat, ozone, or primer layers. Extrusion line speeds were within the range of 150-1400 feet per minute across a 80"-118" web width. Post corona treatment was used. Roll stock was in-process quality control checked for adhesion using "tape" testing and saturated for visual pin holing. Post production coat weight testing was done consistently using lab instrumentation. Finished and coated roll stock was rewound and sent for converting. Successful converting and packaging forming was done up to three months postextrusion coating. During converting, the roll stock was run for use in high barrier MVR requirement frozen seafood box production lines at speeds up to 250 boxes per minute. The finished composite material was formed, bent, scored, and machined at standard production rates. The mineral-containing surface layer was efficiently offset printed using standard industry inks and aqueous press coatings. The mineral coating layer was highly opaque and improved the brightness of the base paper surface from about 59 bright to about 76 bright. The mineral layer had a resident dyne level range of 44-48 as measured during post-production testing. Moisture barrier testing was completed for large size sampling sizes, which included full converted and formed case samples having MVTR performance of 12 to 16 g/m²/24 hrs@ 100% humidity in tropical conditions with mineral composite layer coat weights from 12 lbs/3 msfto 16 lbs/3 msf.

EXAMPLE 3

Example 3 illustrates three different finished repulpable composites containing bleached virgin board SBS paper within a caliper range from about 0.014" to about 0.028" having a mineral-containing layer extrusion-coated to the fiber-containing layer. These composites were analyzed for ash content with Tappi standard T21 1, and for repulpability using an in-house procedure developed by the Georgia Institute of Technology. Results indicated that ash content varied from about 2.21% up to about 21.44%. Screen yield and overall recovery seem to depend at least in part on ash content of the starting paper. A 40% by weight mineralized PE resin and a 47% by weight mineralized PE resin, both containing additives, were compounded using wet ground and coated for dispersion finely ground approximately 5.0 to 13.0 micron mean particle sized limestone-originating CaC03 particles with incremental crystalline silica content of less that about 5% by weight. The specific heat of the ground $CaCO_3$ particles was 0.21 kcal/kg·° C. The PE had a density from about 0.919 g/cm³ to about 93.2 g/cm³. The PE bonding agent had a melt flow index of 16 g/10 minutes. The finished and pelletized mineralized compound had an approximate density from about 1.34 g/cm³ to about 1.41 g/cm³. The compound was then extruded as a mono layer substantially and continuously applied on the fiber-containing layer at from about 7.5 lbs/3 msf to about 16 lbs/3 msf layer weight contacting the uncoated side of International Paper Fortress SBS and Clearwater Paper Candesce SBS having approximately 89% to approximately 100% bleached virgin fiberboard with nominal basis weight from about 182 lbs to about 233 lbs, with the paper surface having a TAPPI T-441 Sheffield Smoothness of approximately 68-72, a 5% to 7.5% moisture content, and a TAPPI T 556 MD-CD Taber Stiffness g-cm above 375 and 105, respectively. The extrusion processing condition melt temperature was from about 565° F. to about 610° F., with barrel temperatures from zone one to zone six from about 400° F. to about 605° F. The die temperature zones were approximately 575° F. to 610° F. The extruder die gap setting was within the range of about 0.020"-0.040". The extruder air gap was approximately 4"-16", providing excellent extrudate to fiber adhesion without a gas pre-heat, ozone, or primer layers. The extrusion line speeds were within the range of 150-1600 feet per minute across a 55"-118" web width. Post corona treatment was used. Roll stock was in-process quality control checked for adhesion using "tape" testing and saturated for visual pin holing. Post production coat weight testing was done consistently using lab instrumentation. Finished and coated roll stock was rewound and sent for converting. Successful converting and packaging forming was done up to three months postextrusion coating. During converting, the roll stock was run for use in high barrier MVR requirement frozen seafood box production lines at speeds up to 250-500 boxes per minute, and cupstock as well as ice cream packaging material converted from about 150 to about 600 formed units per minute. The finished composite material was formed, bent, scored, and machined at standard production rates. The mineral-containing surface layer was efficiently offset printed using standard industry inks and aqueous press coatings. The mineral coating layer was highly opaque and maintained the fiber layer brightness of the base paper surface from about 80 to about 90 bright. The mineral layer had a post corona treatment resident dyne level range of 42-56 as measured during post-production testing. Moisture barrier testing was completed for large size sampling sizes, which included full converted and formed case samples having MVTR performance of about 8 g/m²/24 hrs to about 16 g/m²/24 hrs @ 100% humidity in tropical conditions with mineral composite layer coat weights from about 7.5 lbs/3 ms to about 16 lbs/3 msf. Packages were closed and sealed using standard heat seal procedures found on cup forming and folding carton production lines.

EXAMPLE 4

Repulpability Experiment

1. Ash Content

Ash content was measured following Tappi standard T413. The time at maximum temperature was extended to eight hours to ensure complete ash.

TABLE 12

Ash/Solids Content for Six Paper Samples
Ash/Solids Content

| Sample | Dish, g | Sample Wt., g | Solids, % | Ash Content, % |
| --- | --- | --- | --- | --- |
| 1# | 27.7401 | 1.1446 | 95.83 | 21.41 |
| Duplicate | 15.8099 | 1.1136 | 96.20 | 21.46 |
| Average | | | 96.02 | 21.44 |
| 2# | 18.8742 | 1.0837 | 96.16 | 5.41 |
| Duplicate | 16.1962 | 0.9697 | 96.11 | 6.45 |
| Average | | | 96.14 | 5.93 |
| 3# | 15.7174 | 1.0131 | 95.92 | 2.17 |
| Duplicate | 16.5933 | 1.0285 | 95.73 | 2.26 |
| Average | | | 95.83 | 2.21 |
| 4# | 17.9733 | 0.9974 | 96.09 | 9.31 |
| Duplicate | 18.4839 | 1.0778 | 95.75 | 9.32 |
| Average | | | 95.92 | 9.32 |
| 5# | 16.3182 | 1.0548 | 95.92 | 4.11 |
| Duplicate | 18.3800 | 1.2260 | 96.28 | 3.83 |
| Average | | | 96.10 | 3.97 |
| 6# | 28.1106 | 1.3772 | 94.88 | 2.80 |
| Duplicate | 27.5611 | 1.5707 | 95.24 | 2.76 |
| Average | | | 95.06 | 2.78 |

The above results indicate that the ash content of sample 1# is 21.44%, the highest among the six samples, whereas that of sample 3# is only 2.21%. It is contemplated that the values shown in Table 12 above may vary by about ±50%.

2. Repulpability

Around 25 g of oven dried paper samples were torn into 1"×1" pieces and weighted into a preheated (around 52° C.) Waring blender, which was equipped with a special blade to reduce fiber cutting. After 1,500 ml of hot (around 52° C.) water was added, the paper was disintegrated on low speed (15,000 rpm) for 4 minutes. The content was then transferred quantitatively into a British disintegrator using 500 ml hot water as rinsing liquor, so that the pulp slurry had a temperature around 52° C. The pulp suspension was then de-flaked for 5 minutes with a British disintegrator at 3,000 rpm. The disintegrated pulp was screened by using a Valley flat screen with 0.01" slot openings for 20 minutes. During the screening, a water head over the screen was maintained at 3" and water flow was kept constant. Accepts and rejects were collected and were used to calculate the screen yield (accepts/starting paper*100) and overall recovery ((accepts+rejects)/starting paper*100). Images of the accepts and rejects were taken to examine the fibers and flakes. After full completion of the repulpability cycle, the entire procedure was completed without using an acid wash to clean the flat screen during the test or dismantling the pressure screens to clean them before completing the test. Also, there was no visible deposition on any part or the disintegrator during the test.

TABLE 13

Repulpability Data of the Paper Samples

| Sample | Start Pulp, g | Accepts, g | Rejects, g | Screen Yield, % | Overall Recovery, % |
|---|---|---|---|---|---|
| #2 | 26.448 | 20.511 | 1.754 | 77.55 | 84.18 |
| #3 | 25.203 | 19.421 | 1.963 | 77.06 | 84.85 |
| #5 | 26.235 | 20.700 | 2.044 | 78.90 | 86.69 |

The samples were disintegrated for 70,000 revolutions. It is contemplated that the values shown in Table 13 above may vary by about ±50%.

3. Determination of Fibers, Plastics, and Ash Compositions—Determined Ash Content of the Fraction Following the Procedure Stated in 1 (above)

Around 0.2 g was weighted into a 50 plastic vial. After 1.8 ml of 72% sulfuric acid was added, the content was mixed thoroughly and the sample mass turned to a paste. The vial was then set in a 30° C. heating block for 1 hour, and the content was stirred periodically. By the end of the heating treatment, water was added to the vial until a total of 50 ml volume was reached. The vial was capped and set in a 121° C. autoclave for two hours. This would completely hydrolyze the carbohydrate components and solubilize the acid soluble inorganics. By the end of hydrolysis, the acid insoluble substances were collected over a tarred glass filter, which was preheated at 550° C. overnight. The collected substances were plastics plus acid insoluble inorganics (ash), which was determined by the procedure stated under heading 1 above. Thus, the fiber content was calculated from the weight difference of starting materials and substances after hydrolysis minus the acid soluble inorganics. This portion of inorganics was determined from the ash content stated under heading 3 above, minus acid insoluble inorganics. The plastics were the weight difference of acid insoluble substances minus acid insoluble inorganics.

Validation—In validation run, 1.5 g starting materials was first hydrolyzed with 15 ml of 72% sulfuric acid at room temperature for 1 hour followed by a 3% sulfuric acid hydrolysis for 4 hours at boiling temperature.

4. Stickies Analysis

Around 0.3 g materials were hydrolyzed following the procedure stated under heading 3 above. The hydrolyzed content was filtered through black filtering paper (15 cm diameter). The retained white residues were thoroughly washed with water until neutral. When the filter paper was dry, the residues on the black filtering paper were scanned with a HP scanner. A known dimension shape was placed in the scanner as a reference. The image thus acquired was input to Image-J software. Set threshold at 125/255 and scale based on the insert reference. The particles were analyzed and the output was input into MS Excel for further calculations. The stickies content was expressed as specified stickies area, which was defined as total stickies area in mm$^2$/weight of starting materials in g.

5. Fate of Rosin Acids

Proper amount of mass from each fraction was weighted into 15 ml vials. After 10 ml DCM and 3 drops of 2 M HCl were added, the vial was firmly capped with Teflon-lined caps, and shaken for 3 minutes. The vial was set in room temperature overnight. 1 ml extract was filtered through a layer of sodium sulfate, and 100 µl clear filtrate was measured into a 1 ml GC vial. After the content was dried under a stream of nitrogen, the residues were derivatized with MSTFA (N-Methyl-N-(trimethylsilyl) trifluoroacetamide) at 50° C. for 30 minutes with periodic shaking. 1 µl derivatized mixture was injected into the GC/MS for analysis. The GC was equipped with 60 meter SPB DB-5 fused silica capillary column and helium was used as carrying gas. GC operation conditions were set as follows: initial temperature 120° C., initial time 5 min., rate 15° C./min., final temperature 315° C., and final time 30 minutes, inject port temperature 250° C. The components were analyzed using an HP 5975C mass detector in EI mode. The operation parameters were properly set to realize maximum detection limit. Identification of individual compounds based on the commercial mass spectra libraries and inhouse libraries. Peak area was used to anticipate the total mass of rosin acids.

6. Starch Detection

Around 0.2 g materials were weighted into a 10 ml vial. After 5 ml water was added, the vial was capped and placed in a 105° C. oven overnight. Around 2 ml water extract was transferred to a test tube and added with 2 drops of 0.1 M iodine solution. If the solution inside the test tube turned to blue, it indicated that starch was present.

Results

1. Repulpability

Coated paper board and product are repulped and recovered in three fractions: accepts, rejects, and wash-out. The oven dry weight of each fraction, along with the accepts yield and overall yield, are listed in Table 14, below.

TABLE 14

Repulpability Data of the Paper Samples Repulpability

| | Start pulp, g | Accepts, g | Rejects, g | Washout, g | Accepts Yield, % | Overall Yield, % |
|---|---|---|---|---|---|---|
| CS-1 | 26.616 | 22.388 | 2.255 | 1.711 | 84.12 | 99.01 |
| IP Mix | 26.170 | 20.573 | 1.376 | 3.770 | 78.61 | 98.28 |
| CLWR_2 | 25.257 | 20.123 | 1.056 | 3.930 | 79.67 | 99.42 |
| CLWR_8.1 | 25.550 | 20.572 | 0.919 | 3.941 | 80.51 | 99.53 |

Results indicated that the accepts yield for all studied samples is close to 80%.

Sample CS-1 had the highest accepts yield and the least amount of wash-out. This result may be due to the uncoating feature of the based paper sheet. For all the samples, the overall yield almost reaches 100%, indicating excellent recovery of the starting materials in the three fractions. All the accepts had particles of impurities in various sizes. Accepts of some samples also contain fragments of plastics that may have been broken down from the plastic coating. Judged from the reference ruler, the size of those particles is less than 1 mm. The rejects also contain small quantities of fibers. During the entire procedure, was completed without the use of acid wash to clean the flat screens in the repulpability tests or dismantling the pressure screens to clean them before finishing the recyclability test. Further, there was no visible deposition on any part of the disintegrator during the repulpability test or anticipated in a recyclability test. It is contemplated that the values shown in Table 14 above may vary by about ±50%.

2. Compositions of the Three Fractions

Compositions of the fractions are divided into three categories: fibers, plastics and inorganics which may come from the fillers in the base paper and the mineral coatings in the coating layers. Through the acid hydrolysis-ash operations, the fibers, plastics and inorganics can be distinguished and quantified. This is based on the fact that fibers are composed of carbohydrates and they are readily hydrolyzed in sulfuric acid solution under elevated temperature. Plastics, however, are generally resistant toward such hydrolysis and will be recovered as insoluble substances. In the ashing process, both fibers and plastics will be burnt out. Inorganics survive this process and are recovered as ash.

Table 15, below, lists the experimental results indicating the percentage of each fraction in each sample.

TABLE 15

Percent Compositions of the Three Fractions

| | | Accepts | | | Rejects | | | Wash-out | | |
|---|---|---|---|---|---|---|---|---|---|---|
| Sample | Ash | Fibers | Plastics | Ash | Fibers | Plastics | Ash | Fibers | Plastics | Ash |
| CS-1 | 0.24 | 98.92 | 0.74 | 0.40 | 3.56 | 96.44 | 0.04 | 82.44 | 1.47 | 17.78 |
| IP Mix | 8.18 | 92.18 | 3.21 | 4.75 | 1.05 | 89.28 | 9.22 | 68.43 | 2.56 | 29.01 |
| CLWR_2 | 10.33 | 94.43 (94.17) | 1.04 (1.30) | 4.53 | 5.05 | 57.43 | 37.52 | 63.07 | 2.21 | 34.72 |
| CLWR_8.1 | 8.43 | 94.42 (94.11) | 1.00 (1.31) | 4.58 | 10.59 | 54.87 | 34.54 | 61.82 | 2.79 | 35.39 |

Note: Data in parentheses are validation runs. Plastics columns can represent either mineralized layer fragments or separated plastic materials or both. It is contemplated that the values shown in Table 15 above may vary by about ±50%.

In order to obtain reliable results, analysis to accepts of sample CLWR-2 and CL WR-8 was performed in triplet runs: a duplicate run to produce the average result, and a third run in large sample size to serve as validation. As indicated, the majority of the accepts is fibers, accounting for over 92% of the mass. Ash and plastics are minor components existing probably in the forms of small particles. Comparing to sample CS-1, all the accepts from other three samples contains higher amounts of inorganics. As to the plastics components, IP Mix has substantial high quantity than CS-1, whereas those among CS-1, CLWR-2 and CLWR-8.1 are comparable. Plastics are the dominant components in the rejects fraction, especially in sample CS-1. Sample IP Mix, CL WR-2 and CL WR-8.1 have increasingly amounts of inorganics in the rejects. It is not known if these inorganics are closely packed inside the plastics or presented as separated particles. In the washout, the fibers are the major components, especially in sample CS-1 and IP MIX. Sample CL WR-2 and CL WR-8.1 have increasingly amounts of inorganics, probably presented as colloid particles in the washing liquor.

3. Stickies Analysis

Impurities in the accepts are the major concern m the recycled pulp fibers. Although composition analysis in section 2 provides information regarding these impurities, a visualized analysis can provide more subtle features of the impurities. Stickies analysis (some of the particles could also be referred to as "dirties") is thus performed to reveal the particle content and their size distribution.

TABLE 16

Stickies Analysis Results

| | CLWR-2 | | | CLWR-8.1 | | |
|---|---|---|---|---|---|---|
| | Fibers | Rejects | Washout | Fibers | Rejects | Washout |
| Stickies, mm$^2$/g | 108 | n/a | n/a | 123 | n/a | n/a |
| Rosin | +++ | + | +++ | +++ | + | +++ |
| Starch | + | Not detected | + | + | Not detected | + |

Table 16 stickie count is represented as a number of stickies contained in the accepts sampling prior to any further processing. Therefore, the 3 gram hand sheets subsequently made from the accepts fibers contained 100% of the stickies and other miscellaneous particles in the accepts immediately after pulping but before further cleansing or processing such as cleaning, flotation, etc. The hand sheets are pressed and dried at 350° F. and 500 psi on a Carver press for 5 minutes and tested for performance consistent with TAPPI T 537, TAPPI T277, TAPPI T 220, TAPPI 815, TAPPI T 826, TAPPI T 403, TAPPI T 831 and TAPPI T563. It is contemplated that the values shown in Table 16 above may vary by about ±50%.

Figure 7:
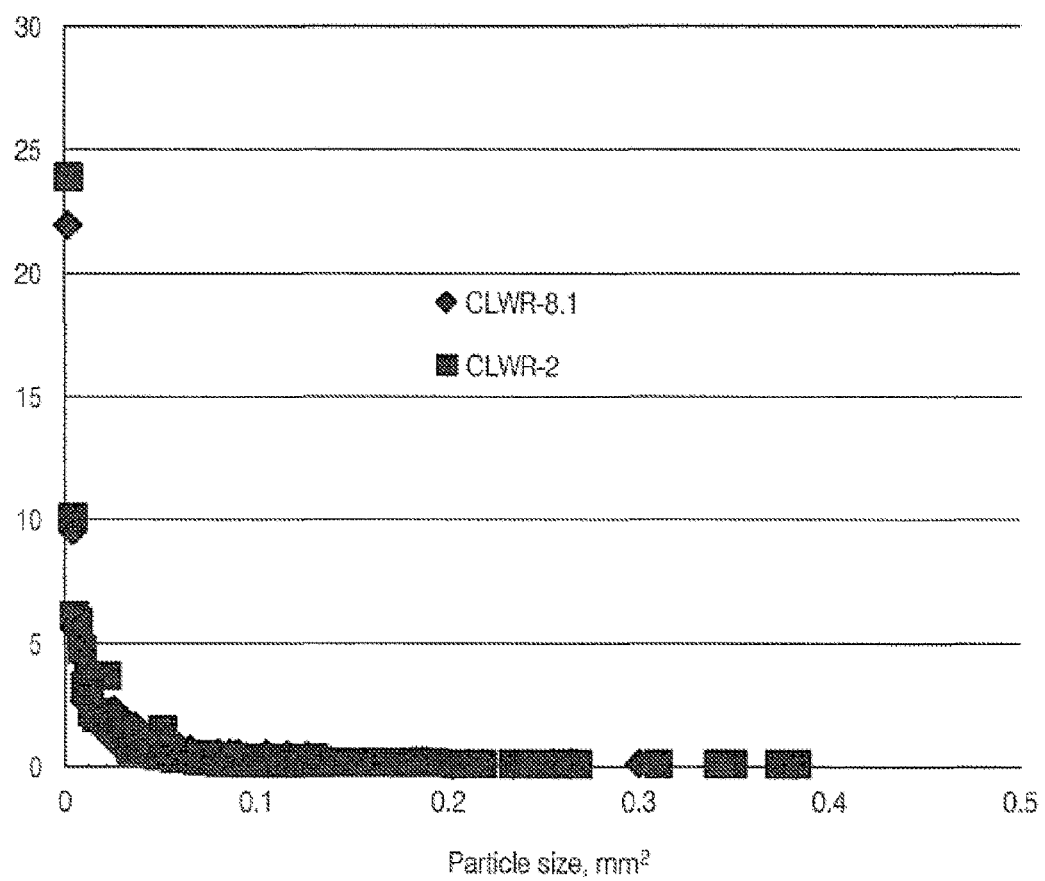
FIG. 7 is a graph showing the stickies content of Sample 6# from Table 12.

Result shown in FIG. 7 indicate that contents of stickies in both CLWR-2 and CLWR-8.1 are comparable. Particle size distribution plots indicate that all the stickies have a size less than 0.4 mm. All particles having an area less than 0.05 mm$^2$ are dominant, with approximately 80% or more of the particles 0.0015 mm$^2$ or less. This result, however, is highly in line with what have been observed the accepts for each sampling. Since no further processing e.g. cleaning, reverse cleaning, flotation, high density cleaning, sidewall washing, peroxide dispersion, sodium hydrosulfite bleaching, hydrosieve washing, or post flotation at specified pH levels, etc., of the accepts occurred, 100% of the stickies or diliies residing in the unprocessed accepts passed directly through to the handsheets. Upon completion of the handsheets, no substantial or important visual or cosmetic difference from that of the virgin control board samples were seen. This exceptional cosmetic result is primarily a factor driven by the very small overall particle size and the white, opaque, color which closely matches the bleached board SBS fibers found in the handsheets and control samples. Further, 100% of the particles are less than or equal to 0.4 mm$^2$ and therefore would not be considered large enough for cosmetic considerations. It is expected that the mineralized board testing samples CS-1, IP MIX, CL WR 8.1 CL W 2 and the handsheets would be considered fully recyclable fibers based on structural, cosmetic, and other considerations including processability within about pH 6 to 8±0.5 pH levels, fiber processing temperature levels from about 110° F. to about 135° F., pulper consistency from about 1.2 to 30%, pulping time from about 10 minutes to about 40 minutes, fiber on fiber yield from about 60% to about 95% and hand sheet drying temperatures in the range of about 240° F. to about 290° F., with finished sheet moisture levels from about 5% to 9%, recyclability testing methods in accordance with testing standards established by TAPPI T220, T815, T826, T403, T83 1, T537, T277, T563.

4. Fate of Rosin Acids

Rosin is a collective name given to a group of chemicals including abietic acid, pimaric acid, isopimirc acid, palustric acid, dehydroabietic acid, etc. The rosin used in the paper making process can also be oxidized into different forms. Nonetheless, the acids are readily extracted by using DCM in acidic medium, and can be easily separated by using a neutral GC capillary column.

Figure 8:
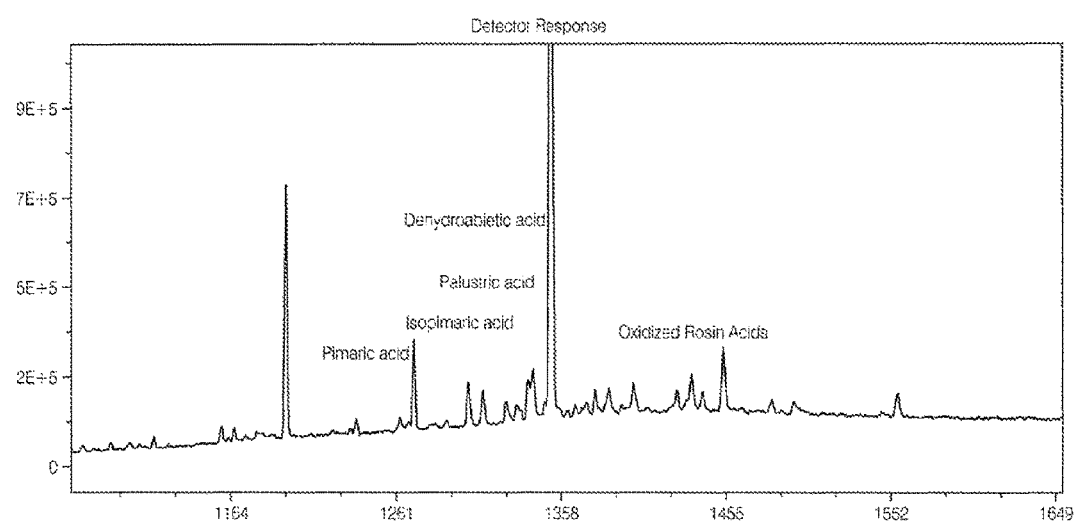
FIG. 8 is a graph showing a total ion spectrum of DCM extract from a washout fraction of sample CL WR-2.
Figure 9:
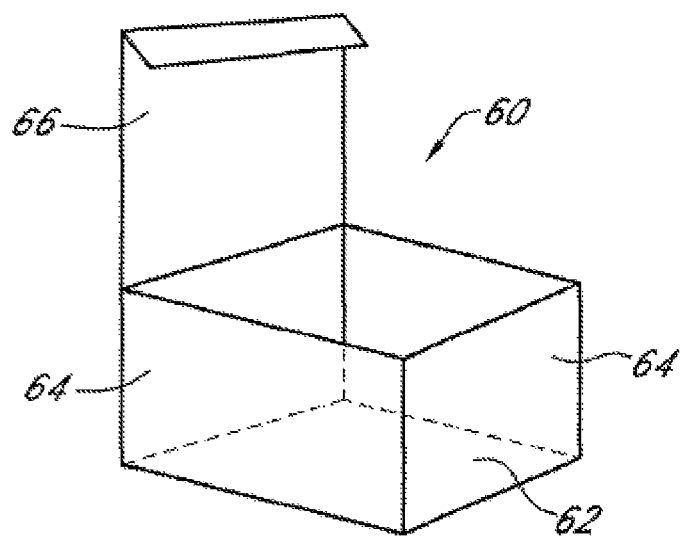
FIG. 9 is an envelope formed from a composite material according to the present embodiments.
Figure 10:
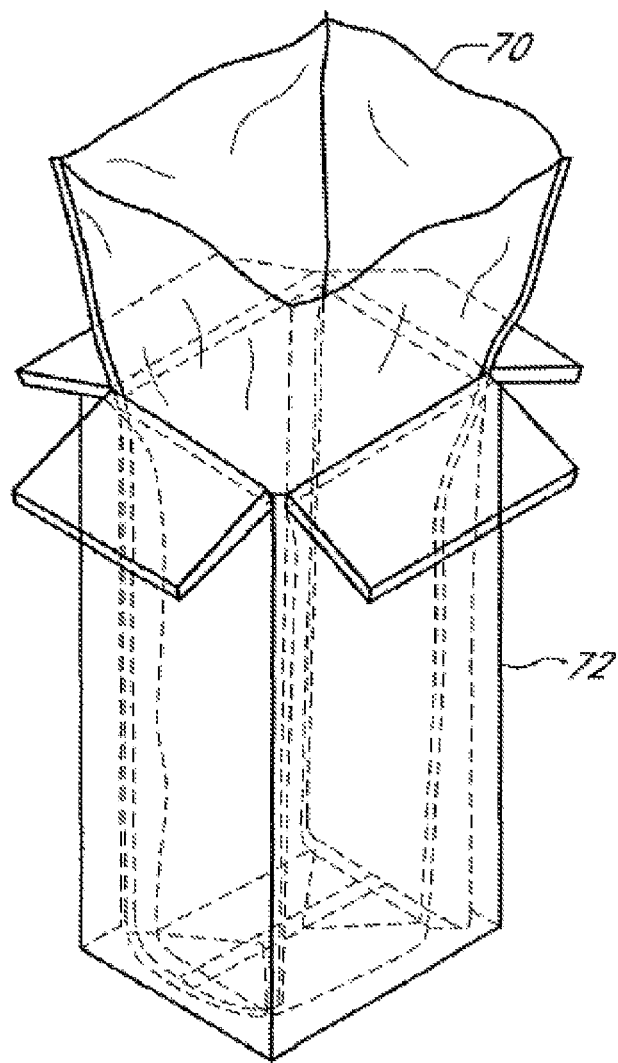
FIG. 10 is a display tray formed from a composite material according to the present embodiments.

Results of GC/MS analysis to the three fractions from sample CL WR-2 and CL WR-8.1 are shown in FIG. 7. FIG. 8 illustrates a typical total ion spectrum of the DCM extract.

As indicated, the rosin acids are separated completely by GC. Judged from the peak area, the fibers fraction contains the highest amount of rosin, following by the washout and the rejects. It is contemplated that the values shown in FIG. 8 may vary by about ±50%.

5. The Whereabouts of Starch

Starch's whereabouts among the three fractions is determined by iodine detection. It is well known that starch will turn the iodine-contained solution into blue color. Based on this phenomenon, starch is found in both the fibers fraction and washout fraction, but not in the rejects fraction, as indicated in Table 3.

EXAMPLE 5

By weight 40% to 60% mineralized resins were applied via extrusion coating were to uncoated and clay coated virgin bleached boards with weights from about 57 lbs per thousand square feet (msl) to about 77 msf and were repulped to produce three fractions: the accepts, the rejects and the wash-out. A full study including repulpability, compositions of different fractions, stickies analysis, fate of rosin acids and starch were performed. Results indicated that the accept yield was over 78%, and an overall recovery of almost 100% was reached when the accepts, the rejects and the wash-out were compiled. In general, the accepts were dominated with fibers, which accounted for over 92% of the mass. However, small amounts of plastics and inorganics (fillers and coatings) were also present. The rejects were mainly plastics, but significant amount of inorganics were also found in some samples. The wash-out collected from the washing liquor contained significant amounts of fibers and inorganics with small portion of plastics. Stickies content in the accepts without any cleaning, screening, washing, or flotation was determined in $mm^2/g$ and was 108 and 123 respectively for sample CWR-2 and CWR-8.1. The stickies or non-fiber particles were quite unique in composition and do not fit the standard industry definition as such, for example, they were not comprised of adhesives, hot melts, waxes, or inks. They were instead comprised of small dense fragmented mineral particles with varying amounts of PE bonding agent attached, forming primarily structures appearing to be easily dispersed as individual particles within the accepted fibers. Other characteristics included relatively high surface energy and little, if any, tackiness. They appeared to resist deformability and appeared to have little potential to cause problems with deposition, quality of sheet, and process efficiency. The stickies and other various particles were predominantly opaque and white in color, with densities projected to fall within a range from about 1.10 $g/cm^3$ to about 4.71 $g/cm^3$. Because of the nature of the stickies, higher processing pH levels or peroxide bleaching would not have the effect of increasing tackiness. The majority of the stickies can be defined as "micro-stickies" as they pmlicles sizes fell beneath 150 microns in size and above 0.001 micron in size. Because of the benign nature of the stickie composition, it is expected they will have little tendency to stick or adhere to equipment during processing. The data indicated that the rosin acids were found in almost all three fractions, but most of them associated with the accepts and the wash-out. An iodine detect technique found that the starch was in the accepts and the wash-out, and the rejects was practically starch-free.

Figure 11:
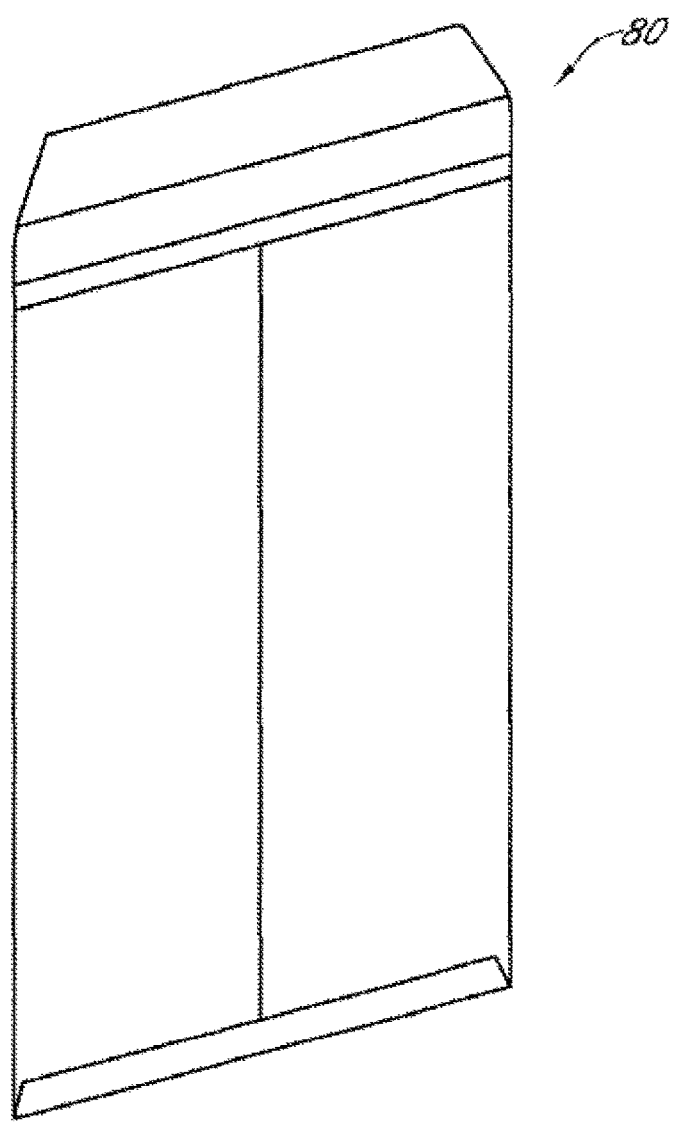
FIG. 11 is an envelope formed from a composite material according to the present embodiments.

The composite structures described herein are well suited to be formed into containers of various types. For example, FIG. 11 illustrates a container comprising a box 60. The box 60 may have many applications, such as, without limitation, retail and shipping. The box 60 may be in the form of a cube or other parallelepiped that is sized to contain an item for retail sale and/or shipping. The box 60 may be formed by preparing the composite structure in the form of a pliable sheet, for example by performing a milling step and/or other processing steps as described above, cutting the structure into a desired shape, and then folding and/or creasing the sheet, either manually or by machine, such as via an automated cartoning process, to form the final three-dimensional box shape. Abutting surfaces of the box 60 may be secured to one another using the various heat seal processes described herein and/or other heat seal processes known in the art. In the embodiment shown in FIG. 11, the composite structure forms the walls of the box 60, including a bottom wall 62, one or more side walls 64, as well as a foldover lid portion 66.

Figure 12:
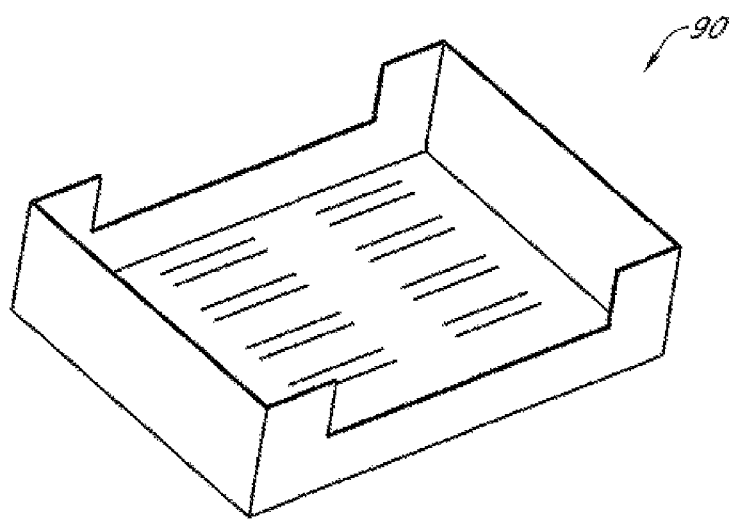
FIG. 12 is a display tray found formed from a composite material according to the present embodiments.

In other embodiments, the composite structures described herein may be formed into a container liner 70 for retail and/or shipping use, as shown in FIG. 12. The liner 70 may be used to line a shipping or retail container 72 to cushion and/or protect a product held in the container 72, as well as to provide moisture resistance and deter infiltration of rodents and other pests. The liner 70 fornled of the composite structure may be sufficiently flexible and pliable such that it is capable of at least partially conforming to the shape of the container 72.

In other embodiments, the composite structures described herein may be formed into a shipping mailer 80, such as an envelope, which may be used to ship documents and/or other items, as shown in FIG. 11. The composite structure may be used to form a part of or even all of the mailer structure 80, and may be fabricated by using a series of folding, creasing, and/or adhesive/heat seal steps to prepare the desired mailer shape.

In other embodiments, the composite structures described herein may be formed into a display tray 90 and/or other sales displays, as shown in FIG. 12. For example, the composite structure may be cut, shaped, and/or folded into the shape of a display tray 90 capable of holding and displaying products for retail sale. The composite structure can be molded by bending and/or folding, as well as via thermo- and/or vacuum-forming to form desired parts of the display 90.

Other non-limiting examples of applications for which the present embodiments are well suited are described in one or more of the following publications, each of which is incorporated herein by reference in its entirety: U.S. Patent Application Publication Nos. 2009/0047499, 2009/0047511, and 2009/0142528.

The above description presents various embodiments of the present invention, and the manner and process of making and using them, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A method of recycling a composite material comprising:
   obtaining a composite material comprising a fiber layer and a barrier layer that is coupled to the fiber layer, wherein the barrier layer comprises a mineral containing layer having a mineral content of 15% to 70%;
   pulping the composite material to produce released fibers and mineral containing layer fragments having an area of less than 0.1 mm$^2$ and a density ranging from 1.01 g/cm$^3$ to 4.25 g/cm$^3$; and
   removing unwanted materials comprising at least a portion of the mineral containing layer fragments from the released fibers by a screening process having a rejection rate of less than 25% by weight of the composite material, wherein screen cleanliness efficiency is greater than 60%.

2. The method of claim 1, wherein the screening process comprises applying a suspension comprising released fibers to one or more screening plates.

3. The method of claim 2, wherein at least one of the one or more screening plates are selected from the group consisting of a hole screen, a slotted screen, and a contoured screen.

4. The method of claim 3, wherein the hole screen comprises one or more hole screen openings having a diameter of 0.8 mm to 1.5 mm.

5. The method of claim 3, wherein the slotted screen comprises one or more slotted screen openings having a width of 0.1 mm to 0.4 mm.

6. The method of claim 3, wherein the contoured screen comprises one or more contoured screen openings have a width of 0.1 mm to 0.4 mm.

7. The method of claim 2, wherein a pressure drop across the one or more screening plates is less than 12 kPa of Feed-Accept pressure.

8. The method of claim 1, further comprising a post-screening process step comprising centrifugal cleaning of screen accepts, wherein the screen accepts comprise at least a portion of the unwanted materials and at least a portion of the released fibers.

9. The method of claim 8, wherein the centrifugal cleaning is performed in a tapered cylinder.

10. The method of claim 9, wherein cleaned fibers comprising the released fibers separated from the unwanted materials are carried inward to an accepted stock inlet.

11. The method of claim 8, wherein the unwanted materials comprise at least a portion of the mineral containing layer fragments, and wherein greater than 70% by mass of the mineral containing layer fragments of the unwanted materials are removed from the screen accepts.

12. The method of claim 11, wherein the mineral containing layer fragments are at least partially spherical and have a diameter of 0.05 μm to 150 μm.

13. The method of claim 1, wherein the caliper of the composite material is 0.254 mm to 0.762 mm.

14. The method of claim 1, wherein overall recovery of the fiber layer is greater than 70%.

* * * * *